US012587228B2

(12) United States Patent
McKeefery et al.

(10) Patent No.: US 12,587,228 B2
(45) Date of Patent: Mar. 24, 2026

(54) SYSTEMS, METHODS, AND APPARATUS FOR A NETWORK DEVICE TRANSCEIVER

(71) Applicant: NoCell Technologies, LLC, Aliso Viejo, CA (US)

(72) Inventors: Donald McKeefery, Irvine, CA (US); Carolus Nolet, Jr., Aliso Viejo, CA (US)

(73) Assignee: NoCell Technologies, LLC, Aliso Viejo, CA (US)

( * ) Notice: Subject to any disclaimer, the term of this patent is extended or adjusted under 35 U.S.C. 154(b) by 549 days.

(21) Appl. No.: 17/690,807

(22) Filed: Mar. 9, 2022

(65) Prior Publication Data

US 2023/0291429 A1 Sep. 14, 2023

(51) Int. Cl.
*H04B 1/3888* (2015.01)
*H04B 1/3877* (2015.01)
*H04B 1/3883* (2015.01)
*H04B 17/318* (2015.01)

(52) U.S. Cl.
CPC ......... *H04B 1/3888* (2013.01); *H04B 1/3877* (2013.01); *H04B 1/3883* (2013.01); *H04B 17/318* (2015.01)

(58) Field of Classification Search
CPC ..... H04W 4/44; H04B 1/3883; H04B 1/3877; H04B 1/3888
See application file for complete search history.

(56) References Cited

U.S. PATENT DOCUMENTS

| | | | |
|---|---|---|---|
| 8,994,492 B2 | 3/2015 | Farhan et al. | |
| 9,104,537 B1 * | 8/2015 | Penilla | G06Q 10/20 |
| 9,828,097 B1 * | 11/2017 | Mishra | G05D 1/105 |
| 10,069,191 B1 * | 9/2018 | Stieber | H04B 1/3883 |
| 10,696,196 B2 * | 6/2020 | Yetukuri | B60N 2/14 |

(Continued)

OTHER PUBLICATIONS

D. McKeefery et al., "System, Method And Apparatus For Facilitating The Restriction Of The Use Of One Or More Network Devices Through Automated Policy Enforcement," filed Apr. 29, 2019, U.S. Appl. No. 16/398,127 including its prosecution history**.

(Continued)

*Primary Examiner* — Khalid W Shaheed
(74) *Attorney, Agent, or Firm* — Rutan & Tucker, LLP; Kyle M. St. James

(57) ABSTRACT

An apparatus and system for obtaining sensory data is disclosed. The apparatus includes a housing configured to couple to a first network device, a battery displaced within the housing, and circuitry displaced at least partially within the housing, the circuitry including an integrated circuit, an accelerometer, and a communications interface, wherein the circuitry includes logic configured to perform operations including receiving signals from one or more network devices including the first network device, parsing a first signal to (i) identify a unique identifier of the first network device of the one or more network devices, wherein the first network device transmitted the first signal, and (ii) determine a received signal strength indicator (RSSI) value of the first signal, and transmitting a communication to the first network device indicating the RSSI value of the first signal. The housing may be formed from any of hardened plastic, metal, glass, or composite.

16 Claims, 23 Drawing Sheets

(56) References Cited

U.S. PATENT DOCUMENTS

| | | | | |
|---|---|---|---|---|
| 11,122,159 B1 * | 9/2021 | Alsolami | .......... | H04M 1/72463 |
| 2008/0064427 A1 * | 3/2008 | Luebke | ................. | H04W 8/245 |
| | | | | 455/500 |
| 2009/0072118 A1 * | 3/2009 | Zheng | ................. | B60R 11/0258 |
| | | | | 248/682 |
| 2011/0281519 A1 * | 11/2011 | Reuss | ................... | H04W 8/005 |
| | | | | 455/41.2 |
| 2015/0203125 A1 * | 7/2015 | Penilla | ................. | G07C 5/0808 |
| | | | | 701/1 |
| 2015/0382156 A1 * | 12/2015 | Gruteser | ................. | H04W 4/44 |
| | | | | 455/456.1 |
| 2017/0039784 A1 * | 2/2017 | Gelbart | .................... | G07C 5/00 |
| 2022/0386945 A1 * | 12/2022 | Wu | ....................... | A61B 5/1123 |
| 2023/0004174 A1 * | 1/2023 | Burghardt | .............. | G05D 1/102 |

OTHER PUBLICATIONS

D. McKeefery et al., "System, Method And Apparatus For Obtaining Sensory Data," filed Feb. 24, 2020, U.S. Appl. No. 16/799,766 including its prosecution history**.

D. McKeefery et al., "System, Method And Apparatus For Obtaining Sensory Data," filed May, 9, 2022, U.S. Appl. No. 17/740,270 including its prosecution history**.

D. McKeefery et al., "System, Method And Apparatus For Restricting Use Of A Network Device Through Automated Policy Enforcement," filed Apr. 29, 2019, U.S. Appl. No. 16/398,120 including its prosecution history**.

D. McKeefery et al., "System, Method And Apparatus For Secondary Network Device Detection," filed Feb. 24, 2020, U.S. Appl. No. 16/799,758 including its prosecution history**.

D. McKeefery et al., "System, Method And Apparatus To Maintain Policy Enforcement On A Network Device," filed Feb. 24, 2020, U.S. Appl. No. 16/799,768 including its prosecution history**.

D. McKeefery, "Detection Of Network Devices Within A Driver Envelope And Implementation Of Policy Thereon," filed Jun. 29, 2023, U.S. Appl. No. 18/216,454 including its prosecution history**.

D. McKeefery, "Detection Of The End Of A Network Device Trip," filed Jun. 30, 2023, U.S. Appl. No. 18/216,967 including its prosecution history**.

D. McKeefery, "System And Method For Determining A Driver Device From A Plurality Of Network Devices," filed Jun. 11, 2021, U.S. Appl. No. 17/345,389 including its prosecution history**.

D. McKeefery, "System And Method For Determining Network Device Handling," filed Jun. 11, 2021, U.S. Appl. No. 17/345,383 including its prosecution history**.

D. McKeefery, "System And Method For Rapid Release Of Policy Implemented On A Mobile Device," filed Jun. 11, 2021, U.S. Appl. No. 17/345,385 including its prosecution history**.

D. McKeefery, "System And Method For Release Of Policy Implemented On A Mobile Device Whilein Motion," filed Aug. 2, 2023, U.S. Appl. No. 18/364,398 including its prosecution history**.

D. McKeefery, "Systems And Methods For Detection Of Failure To Establish A Communicative Coupling Between Network Device And Transceiver Device," filed May 31, 2023, U.S. Appl. No. 18/204,235 including its prosecution history**.

D. McKeefery, "Systems And Methods For Determining A Wireless Communications Module Of A Network Device Has Been Disabled," filed Sep. 1, 2021, U.S. Appl. No. 17/464,179 including its prosecution history**.

D. Swartz et al., "System, Method And Apparatus For Generating A Zone Restricting Use Of A Mobile Device," filed June, 6, 2017, U.S. Appl. No. 15/615,745 including its prosecution history**.

D. Swartz et al., "System, Method And Apparatus For Generating A Zone Restricting Use Of A Mobile Device," filed Mar. 28, 2018, U.S. Appl. No. 15/939,147 including its prosecution history**.

"Aquavault—ChargeCard® Ultra-Thin Credit Card Size Phone Charger"—<https://theaquavault.com/products/chargecard-credit-card-sized-phone-charger>, last accessed Mar. 16, 2022.

"Enhancements, Inc—26Bit Key Fobs for Schlage/Allegion, Compare to 7610 (XceedID), 25 Fobs" <https://www.id-enhancements.com/26bit-key-fobs-for-schlage-allegion-compare-to-7610-xceedid-25-fobs/?gclid=Cj0KCQiAmpyRBhC-ARIsABs2EAqa5ryMKCgUuk941c5gYQoTk4vwDd0IMb33aQsHNvQ3il7GfDFv-esaAgvIEALw_wcB>, last accessed Mar. 16, 2022.

"IWalk—Small Portable Charger 4500mAh Ultra-Compact Power Bank Cute Battery Pack", <https://www.amazon.com/iWALK-Portable-Charger-Ultra-Compact-Compatible/dp/B085T54V5T?th=1> last accessed Mar. 16, 2022.

"Juice pack connect" https://www.zagg.com/en_us/juice-pack-connect, last accessed Feb. 10, 2022.

"MagBank: Magnetic Wireless Power Bank" <https://traegoods.com/products/magbank?variant=39379368018069&currency=USD&utm>, last accessed Mar. 16, 2022.

"Mightymount—Car Dash & Windshield Phone Mount" <https://www.themightymount.com/products/car-dash-windshield-phone-mount?currency=USD&utm_medium=c&variant=17521367449669>, last accessed Mar. 16, 2022.

* cited by examiner

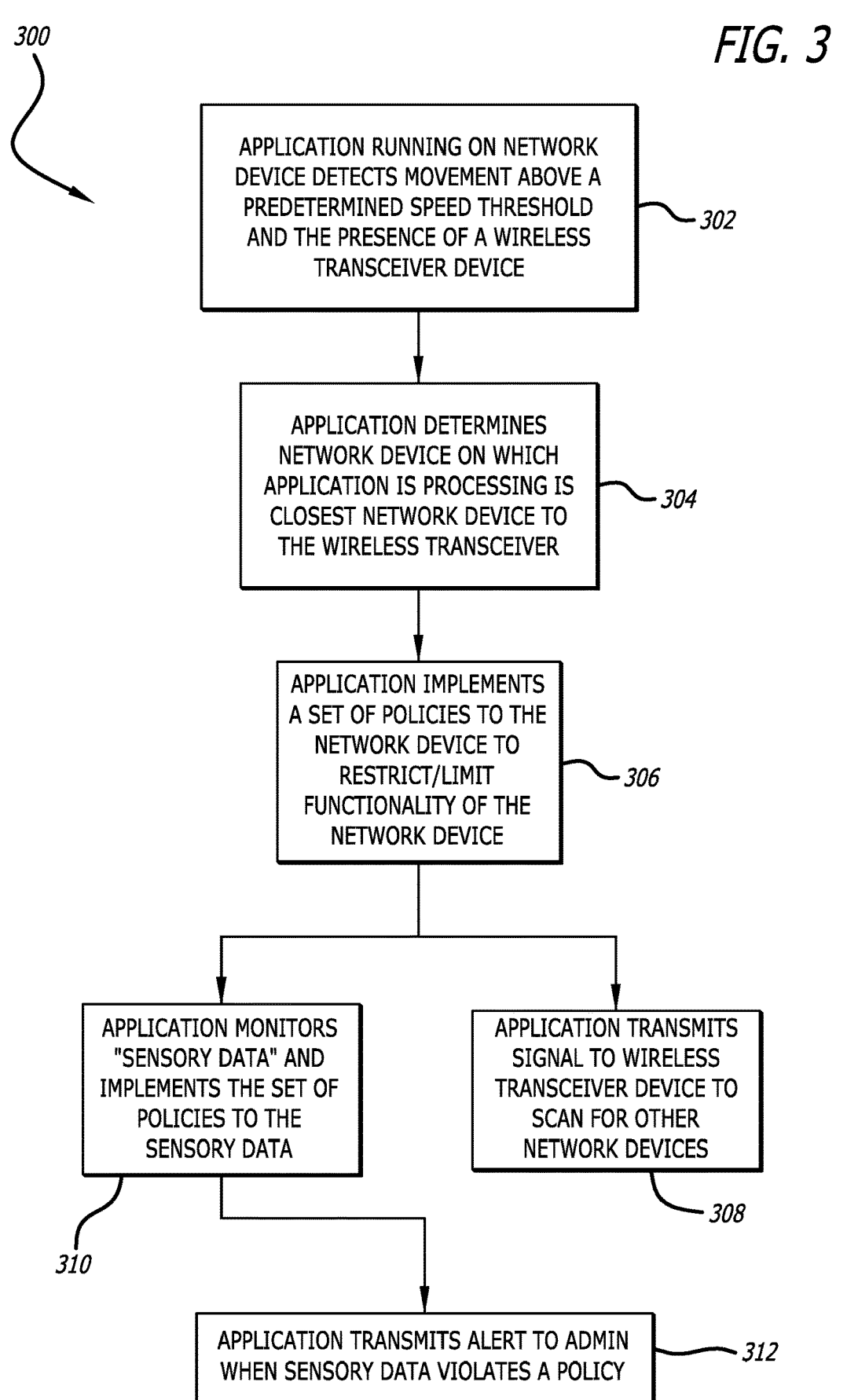

APPLICATION RUNNING ON NETWORK DEVICE DETECTS MOVEMENT ABOVE A PREDETERMINED SPEED THRESHOLD AND THE PRESENCE OF A WIRELESS TRANSCEIVER DEVICE — *302*

APPLICATION DETERMINES NETWORK DEVICE ON WHICH APPLICATION IS PROCESSING IS CLOSEST NETWORK DEVICE TO THE WIRELESS TRANSCEIVER — *304*

APPLICATION IMPLEMENTS A SET OF POLICIES TO THE NETWORK DEVICE TO RESTRICT/LIMIT FUNCTIONALITY OF THE NETWORK DEVICE — *306*

APPLICATION MONITORS "SENSORY DATA" AND IMPLEMENTS THE SET OF POLICIES TO THE SENSORY DATA — *310*

APPLICATION TRANSMITS SIGNAL TO WIRELESS TRANSCEIVER DEVICE TO SCAN FOR OTHER NETWORK DEVICES — *308*

APPLICATION TRANSMITS ALERT TO ADMIN WHEN SENSORY DATA VIOLATES A POLICY — *312*

*FIG. 13*

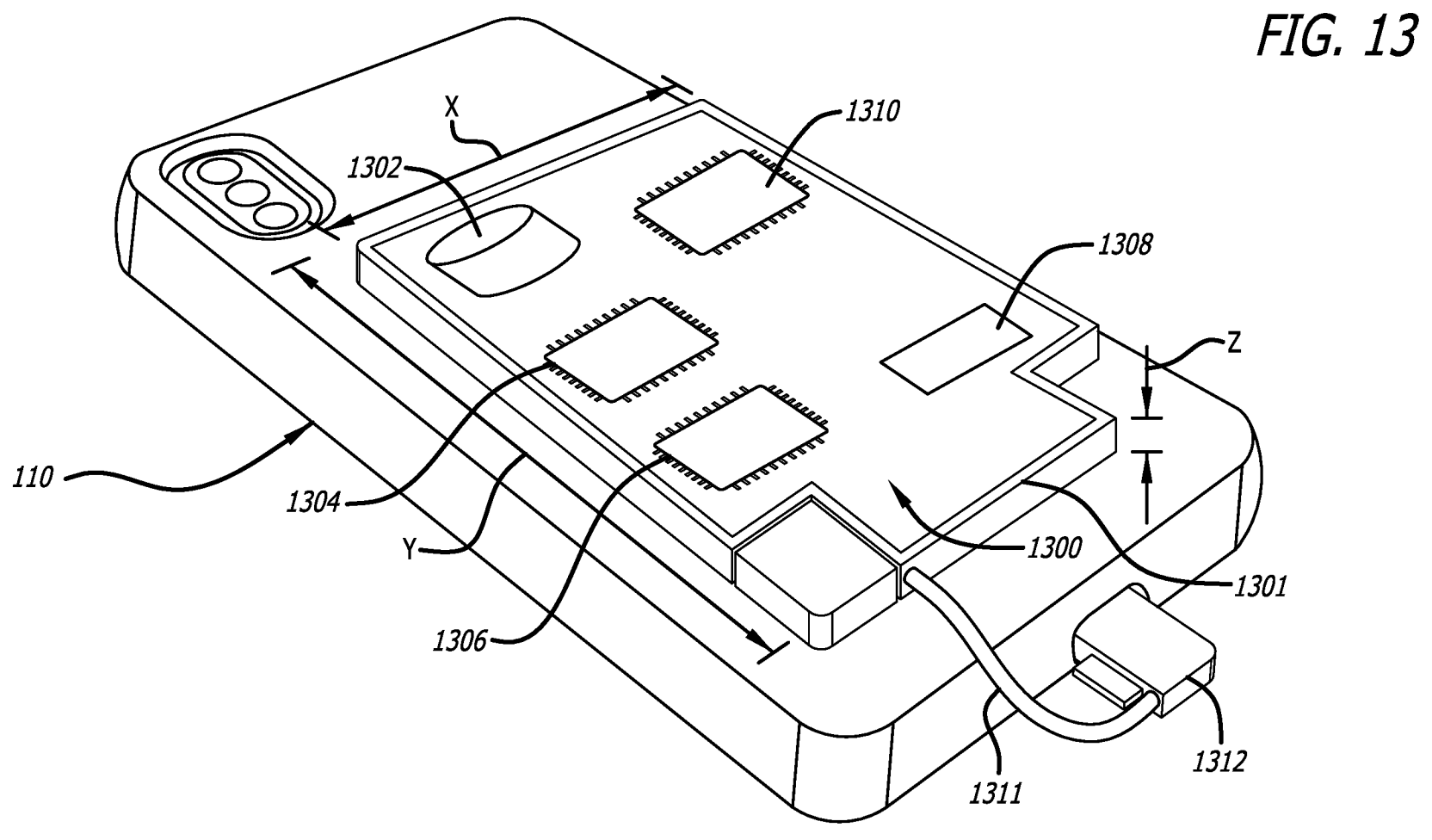

SYSTEMS, METHODS, AND APPARATUS FOR A NETWORK DEVICE TRANSCEIVER

FIELD

Embodiments of the disclosure relate to the field of restricting use of network devices. More specifically, one embodiment of the disclosure relates to a method of determining whether a preferred communication module of a network device located within a vehicle has been disabled or is otherwise improperly functioning.

GENERAL BACKGROUND

Distractions while driving, especially those from electronic devices, are at an all-time high. As mobile devices (e.g., cell phones) have become ubiquitous, it is commonplace for a driver to get into an automobile, start driving and become distracted with his/her cell phone. For instance, drivers often receive and respond to text messages or emails, browse the internet, or browse social media platforms while driving.

Driving while distracted as a result of the presence of electronic devices within reach is a dangerous, and at times, deadly, situation. Although some states have outlawed the act of using a cell phone while driving, not all drivers regularly adhere to these laws. Additionally, drivers may be distracted merely by notification alerts received by a cell phone. For example, a cell phone placed in a cup holder of the center console may alert the driver to a new text message or email via an audible and/or visual notification. The notification may cause the driver to take his/her eyes off of the road momentarily, which has the potential to result in an accident.

Many parents or employers wish to prevent their children/employees from being distracted by the child's or employee's cell phone while driving but also want their children or employees to have a cell phone in case of emergency. However, the use of some functionality of a cell phone may be warranted while driving. For example, a functionality of a cell phone that provides turn-by-turn directions may be used by some drivers and does not cause unnecessary distractions. Further, some drivers may be able to connect their cell phones to the automobile's audio system and play music while driving without causing unnecessary distractions. Additionally, once a child or employee completes his/her drive, there is no need to prevent the child or employee from using his/her cell phone.

Unfortunately, it is far too easy for one or more communication modules of a cell phone to be disabled, which would possibly prevent a system for limiting or restricting the use of the cell phone from communicating with the cell phone. For example, if such a system were to communicate with a cell phone within a vehicle via a BLUETOOTH® module and the driver disabled his/her cell phone's BLUETOOTH® module, the driver may avoid limitations or restrictions of the use of the cell phone while operating the vehicle. Thus, what is needed is a system and methodology for detecting that a cell phone (or other network device) is within a vehicle in the presence of a system intended to limit or restrict the use of the cell phone while the vehicle is operating and a communication module has been disabled or is otherwise improperly functioning, which may indicate an intentional effort to avoid any limitation or restriction on the use of the cell phone.

It is common for a person (employee, child, etc.) to routinely drive the same vehicle on a daily or weekly basis.

Additionally, that person may drive one of a particular group (or fleet) of vehicles such that those vehicles may be configured with systems disclosed herein to detect the person's network device(s) and monitor and/or restrict functionality. What is also needed is an apparatus and/or system that is configured to detect network device(s), monitor and/or restrict functionality of the network device(s), and also be included in a portable housing for use in rental cars, for example.

BRIEF DESCRIPTION OF THE DRAWINGS

Embodiments of the invention are illustrated by way of example and not by way of limitation in the figures of the accompanying drawings, in which like references indicate similar elements and in which:

FIG. 3 is a flowchart illustrating an exemplary process of implementing and monitoring a set of policies by a policy enforcement application of the policy enforcement system of FIG. 1A;

3

4

Figure 1A:
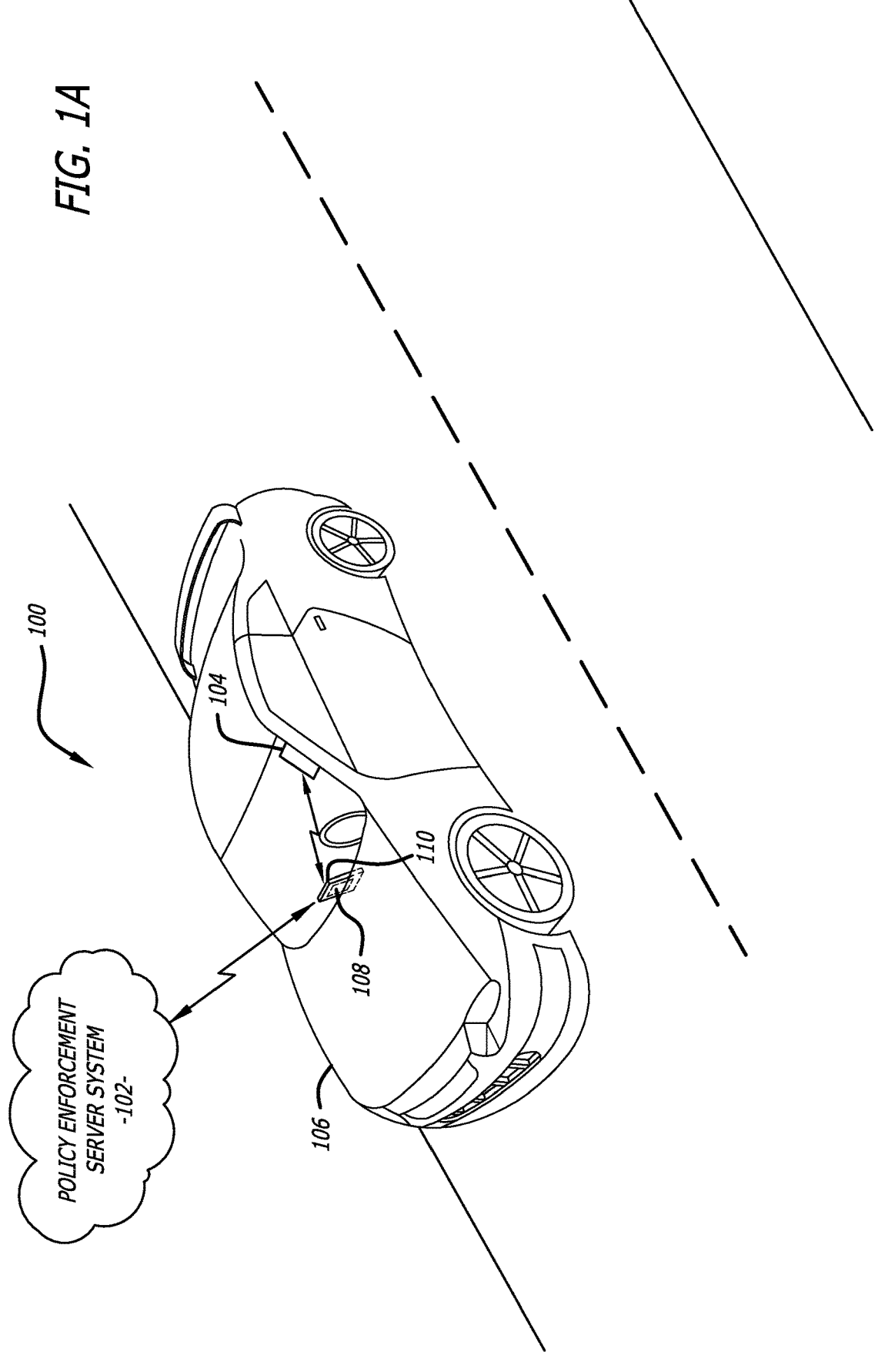
FIG. 1A is an exemplary illustration of a deployment of a policy enforcement system in connection with a first vehicle.
Figure 9A:
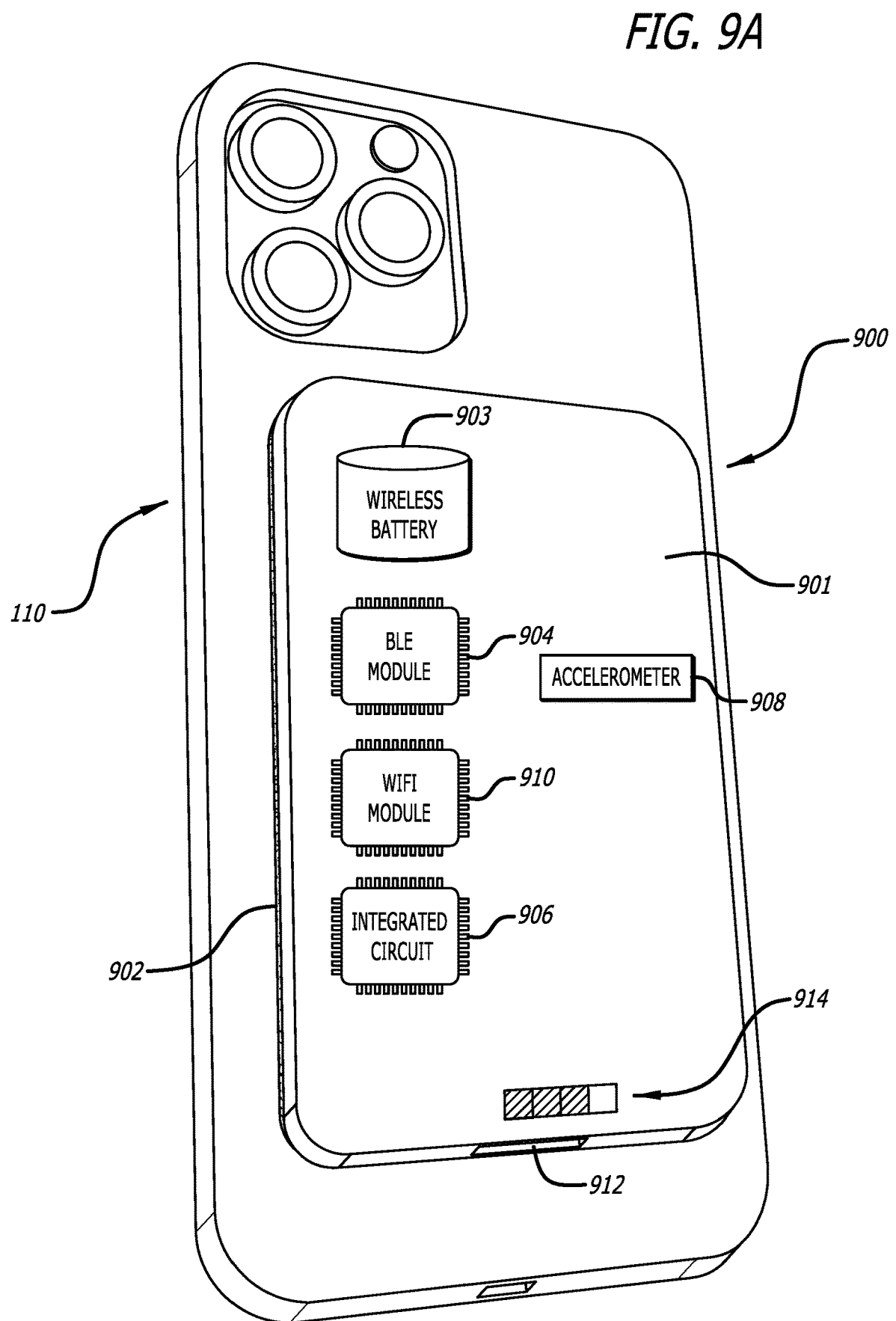
FIG. 9A is a first embodiment of a transceiver apparatus removably coupled to a network device where the transceiver apparatus includes a battery and components providing interoperability with the policy enforcement system of FIG. 1A.
Figure 9B:
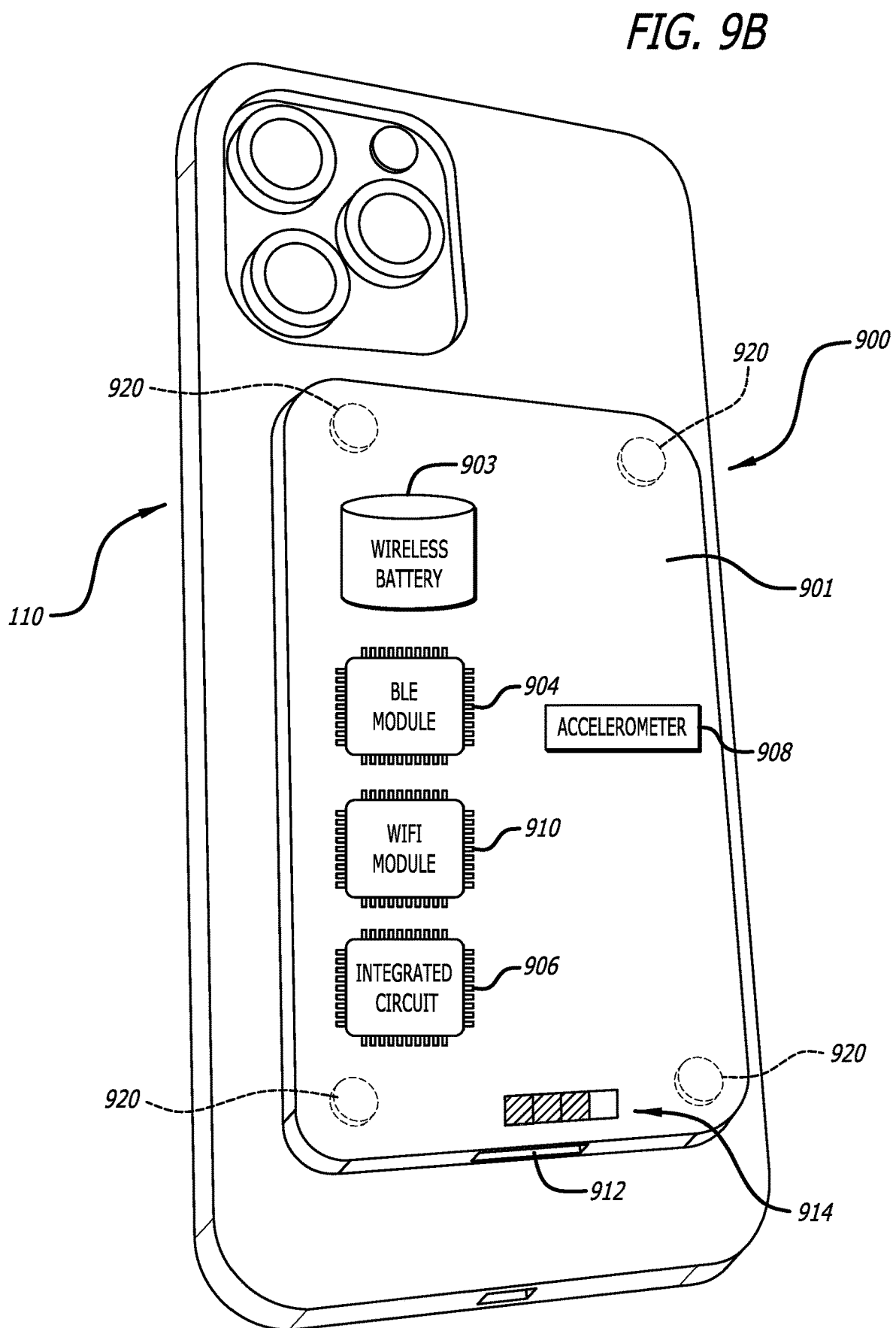
FIG. 9B is a second embodiment of a transceiver apparatus removably coupled to a network device in accordance with some embodiments where the transceiver apparatus includes a battery and components providing interoperability with the policy enforcement system of FIG. 1A.
Figure 9C:
Figure 9D:
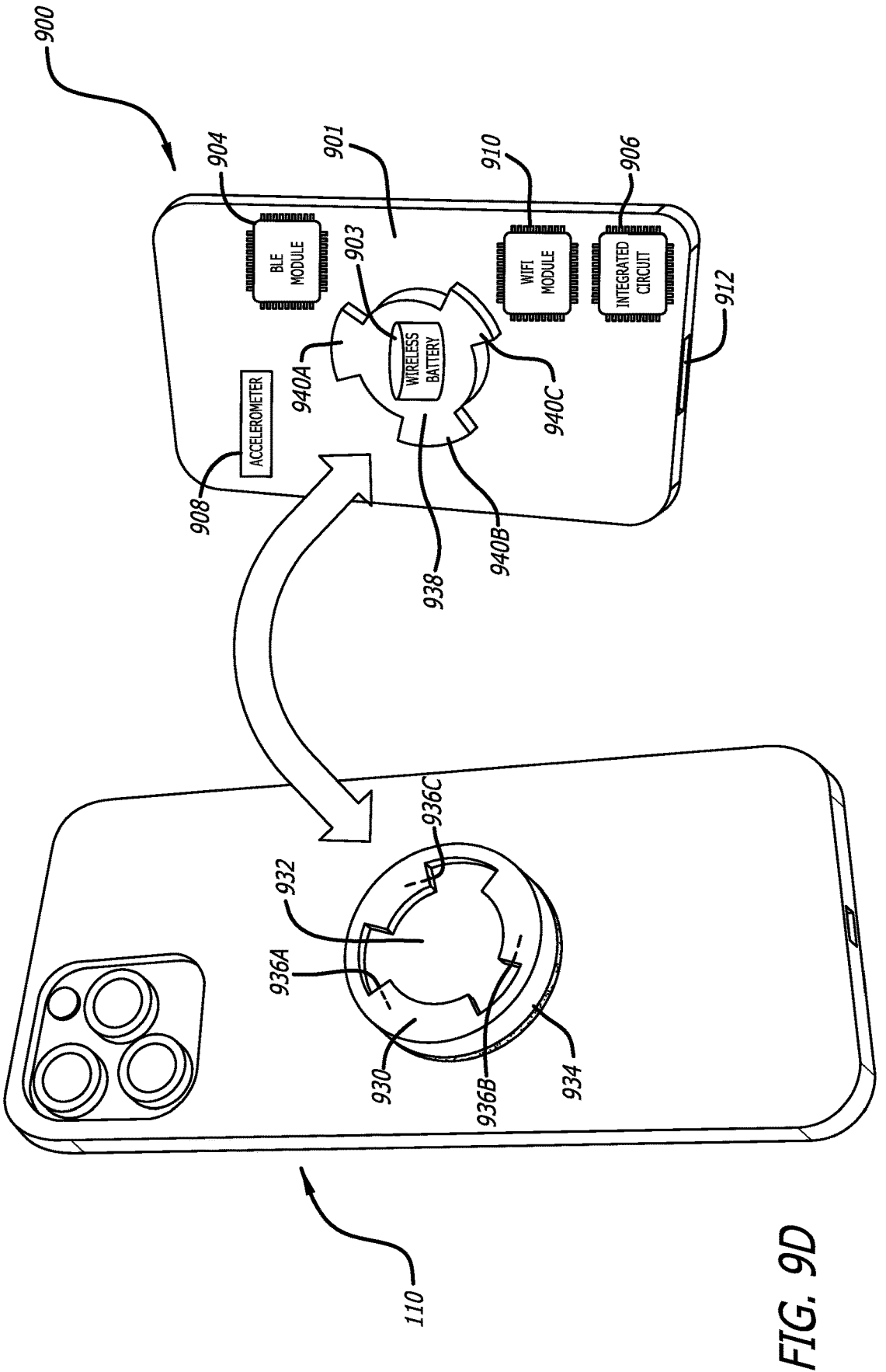
Figure 9E:
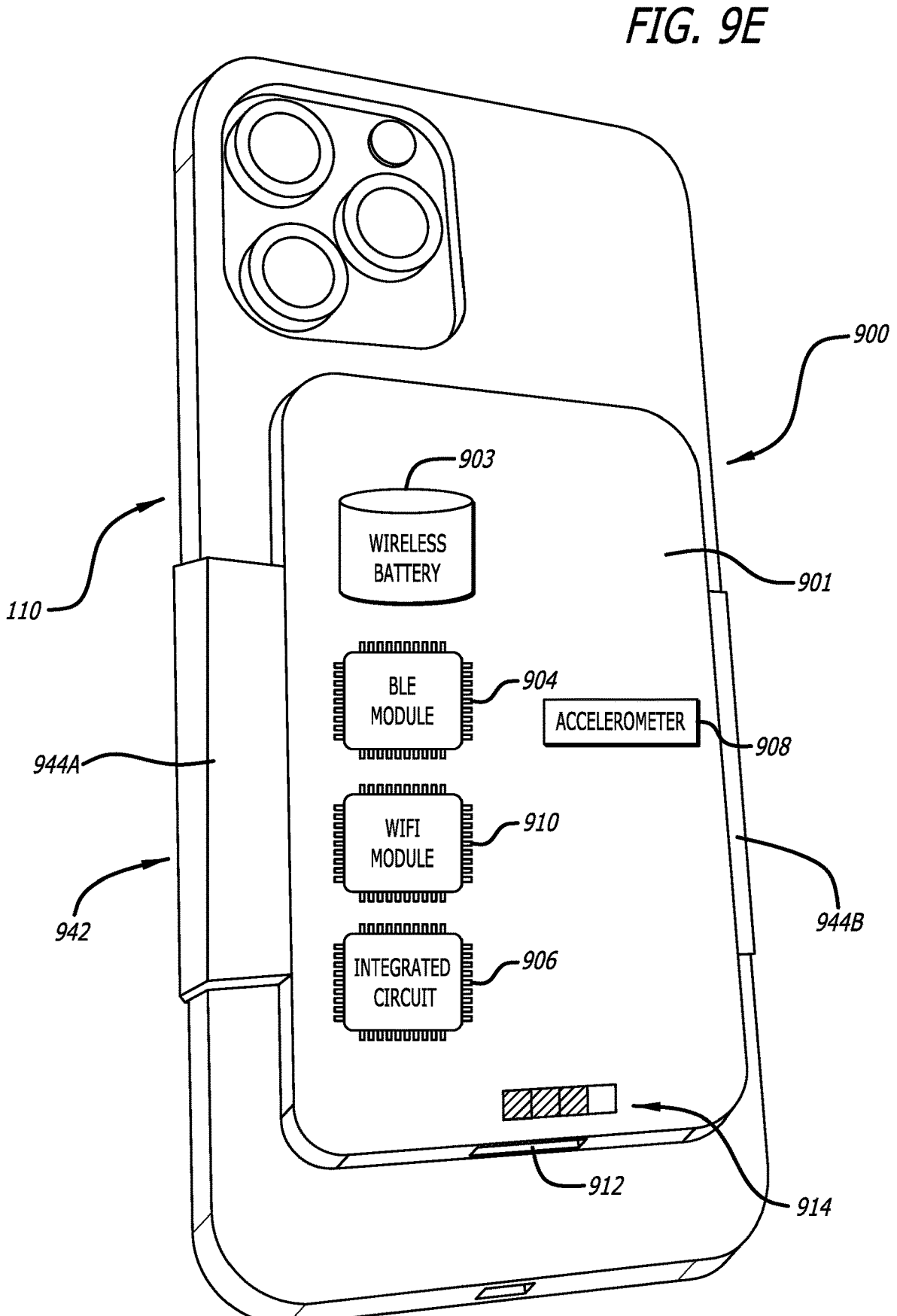
Figure 10:
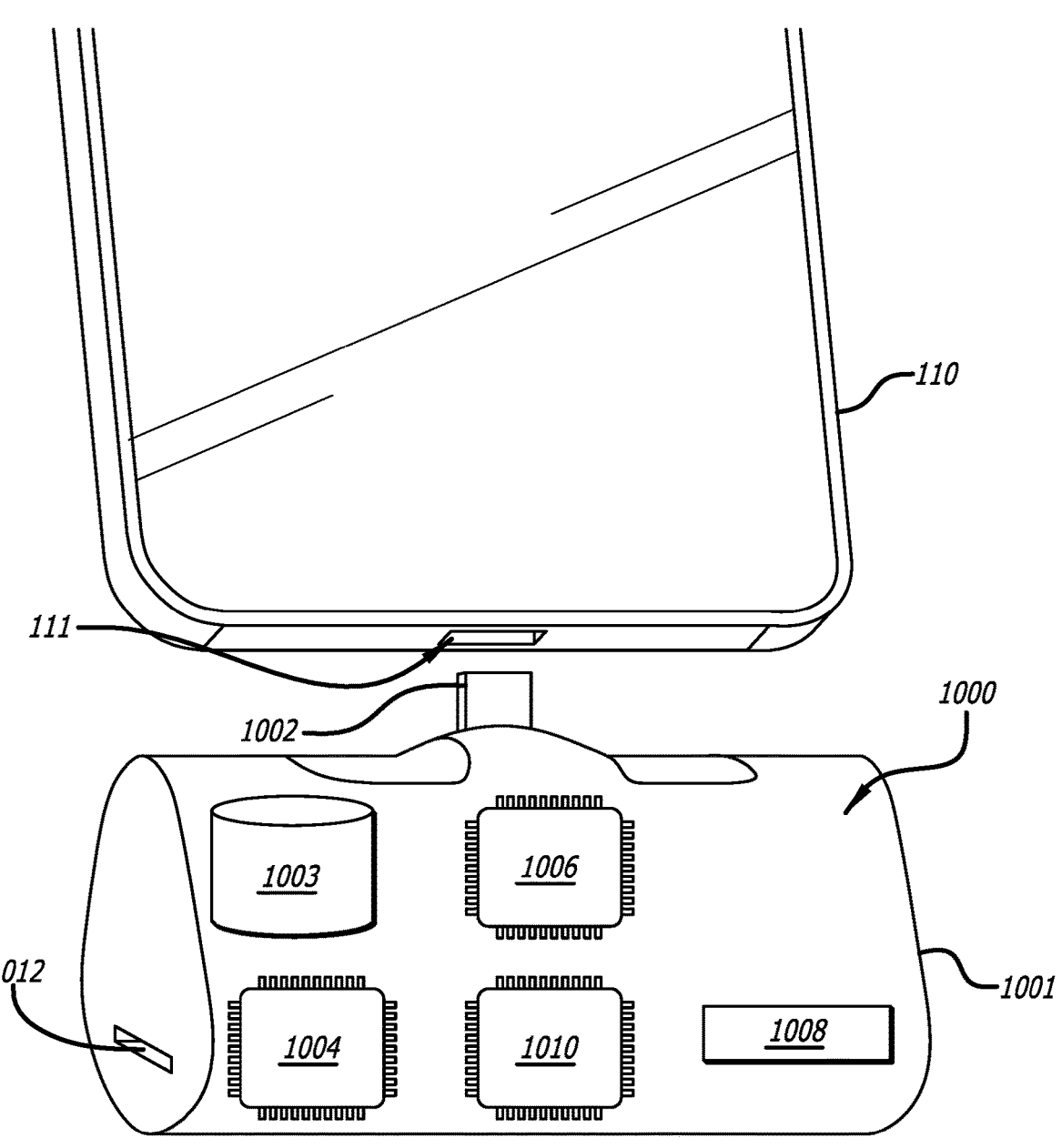
Figure 11:
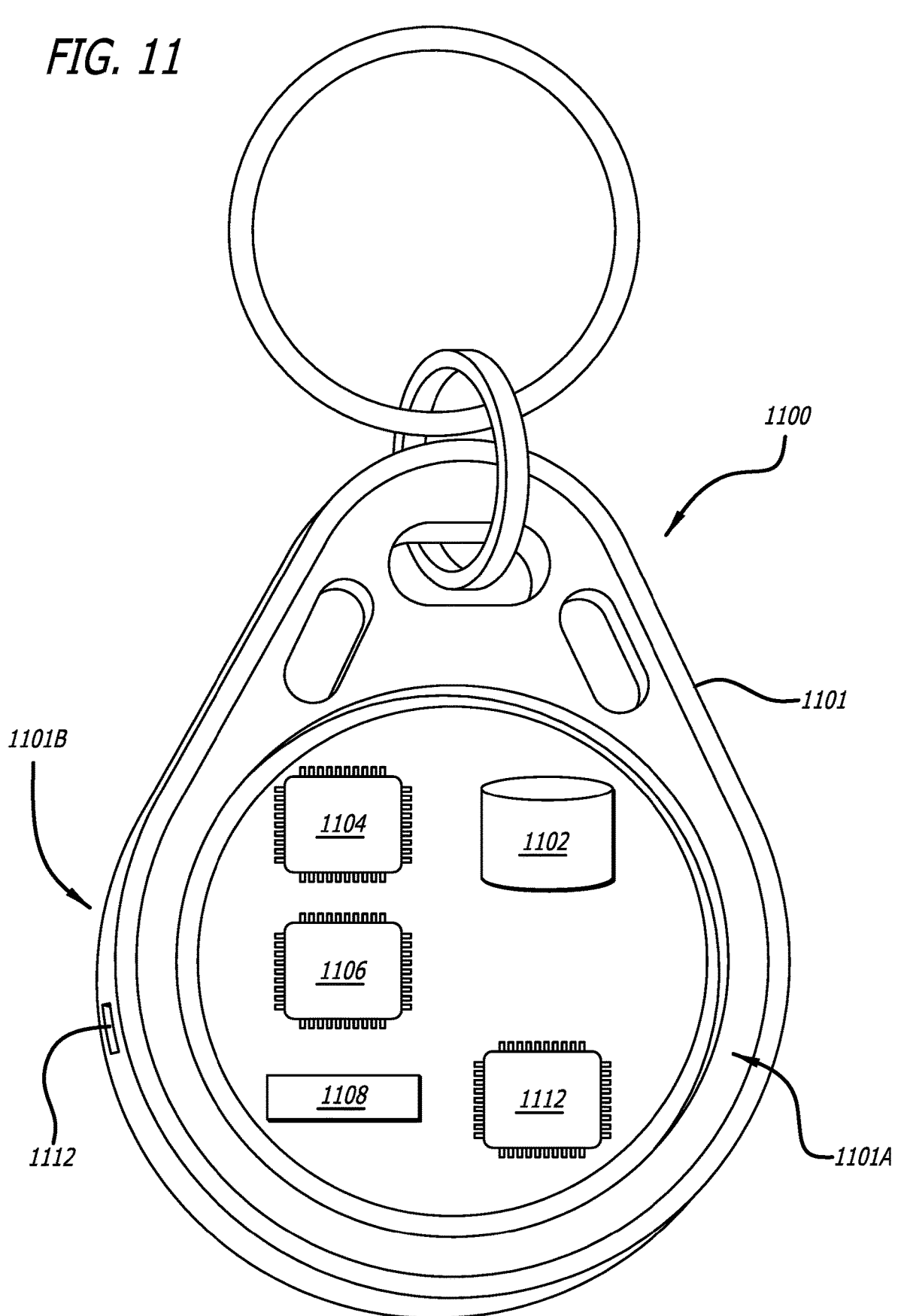
Figure 12A:
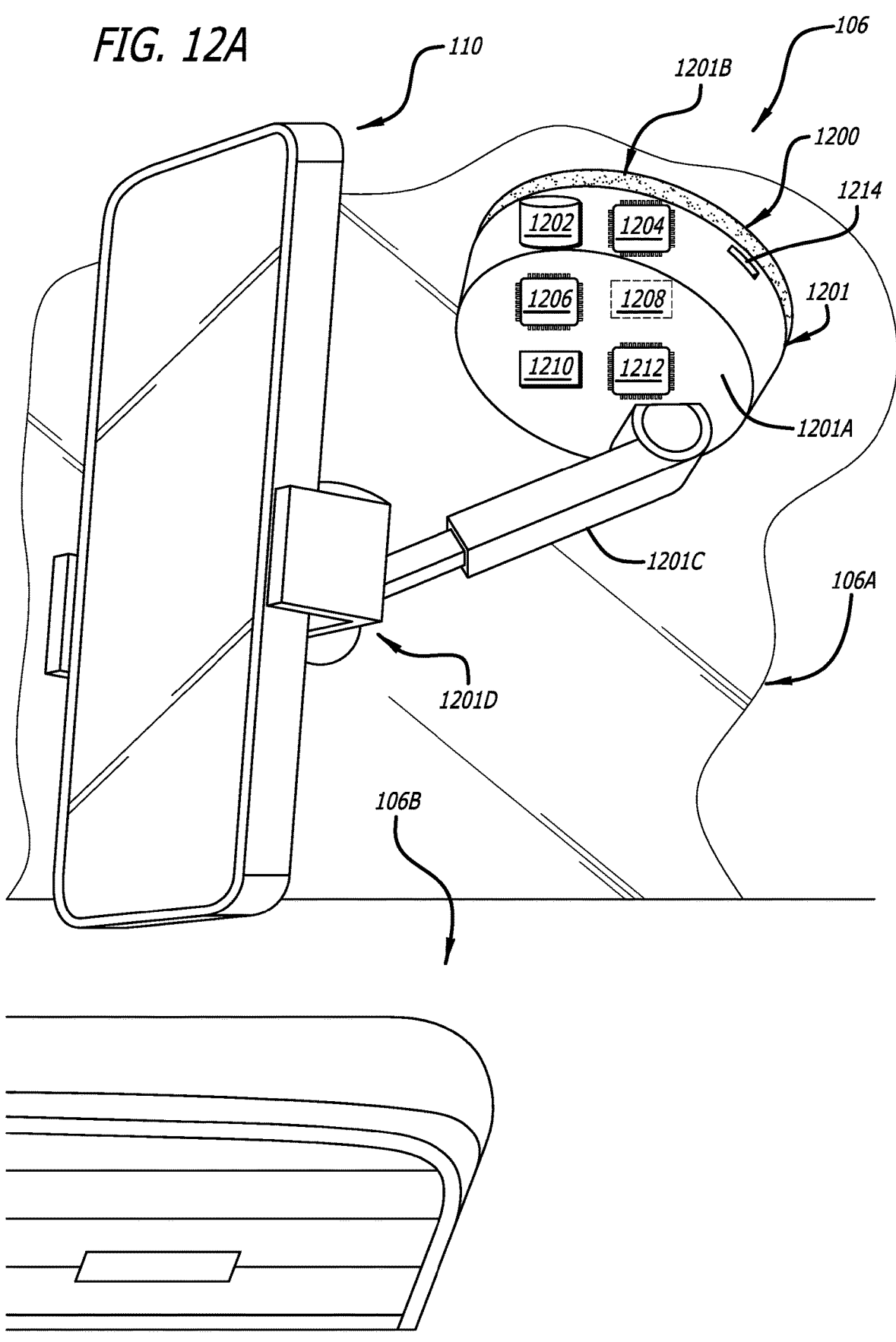
Figure 12B:
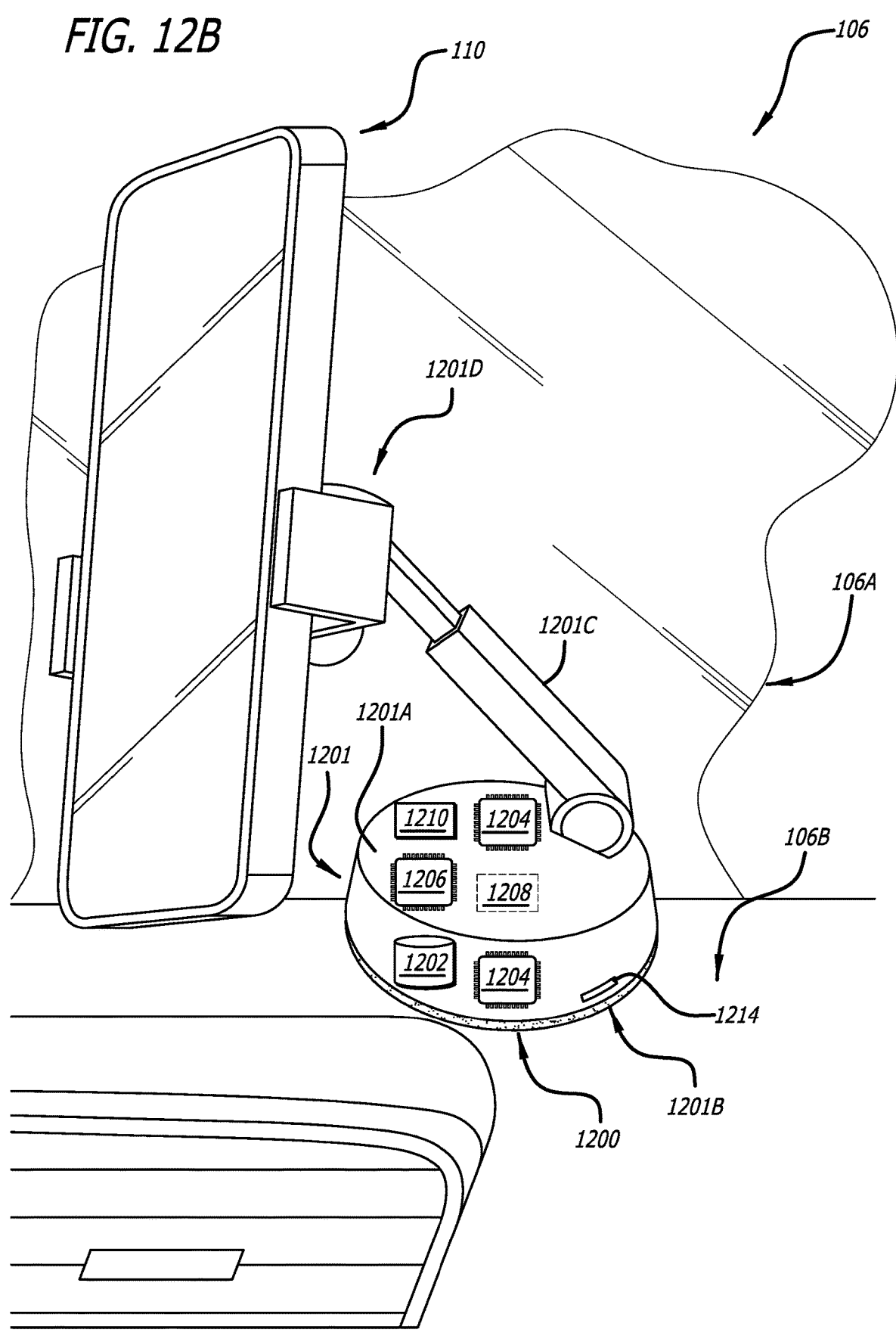

FIG. 9C is a third embodiment of a transceiver apparatus removably coupled to a network device in accordance with some embodiments where the transceiver apparatus includes a battery and components providing interoperability with the policy enforcement system of FIG. 1A;

FIG. 9D is a fourth embodiment of a transceiver apparatus removably coupled to a network device in accordance with some embodiments where the transceiver apparatus includes a battery and components providing interoperability with the policy enforcement system of FIG. 1A;

FIG. 9E is a fifth embodiment of a transceiver apparatus removably coupled to a network device in accordance with some embodiments where the transceiver apparatus includes a battery and components providing interoperability with the policy enforcement system of FIG. 1A;

FIG. 10 is a sixth embodiment of a transceiver apparatus removably coupled to a network device, the transceiver apparatus including a battery and components providing interoperability with the policy enforcement system of FIG. 1A;

FIG. 11 is an embodiment of a transceiver fob apparatus including a battery and components providing interoperability with the policy enforcement system of FIG. 1A;

FIG. 12A is an embodiment of a transceiver network device stand apparatus removably coupled to an interior of an automobile in a first configuration, the transceiver network device stand apparatus including a battery and components providing interoperability with the policy enforcement system of FIG. 1A;

FIG. 12B illustrates the transceiver network device stand apparatus of FIG. 12A removably coupled to the interior of an automobile in a second configuration; and FIG. 13 is a second embodiment of a transceiver apparatus removably coupled to a network device, the transceiver apparatus including a battery and components providing interoperability with the policy enforcement system of FIG. 1A.

DETAILED DESCRIPTION

Embodiments of a system and methods are described for determining whether a network device is a driver device on which a set of policies are to be implemented to restrict or limit the use of the network device when operating in the vehicle. For purposes of clarity, a driver device may be considered as a network device on which a set of policies is to be implemented as compared to other network devices within the vehicle (or "passenger devices") on which a set of policies is not to be implemented. More particularly, a driver device may be assumed to be the network device that the driver of the vehicle will attempt to operate (e.g., the network device physically located closest to the driver).

Described herein is a policy enforcement system that includes a transceiver and a policy enforcement application operating on a network device. In some embodiments, the policy enforcement application may be downloaded on the network device. Generally, the policy enforcement system performs various methods to determine whether one or more network devices are located within an interior cabin space of a vehicle and whether the vehicle, along with each the network device, is moving at a speed above a predetermined threshold. When the policy enforcement system determines that the vehicle and a network device are traveling at a speed above the predetermined threshold, the policy enforcement application operating on the network device implements a set of policies that restrict or limit the use of the network device when operating in the vehicle. For example, the policy enforcement application may restrict or disable one or more predetermined functionalities of the network device. For instance, the functionality to make phone calls or receive emails or other messages may be prevented while the set of policies are implemented. Additional examples of restricting functionality may include, but are not limited or restricted to, prevention of the use of social media applications, prevention of the use of a camera, preventing of the use of internet browser applications, etc.

The transceiver may be an electronic device capable of transmitting wireless signals, such as BLUETOOTH® beacons (e.g., BLUETOOTH® Low Energy (BLE)). Herein, the terms "transceiver" and "wireless transceiver" are used interchangeably, where wireless may refer to the transmission or receipt of data to or from a network device located within a proximity of the transceiver, where the proximity may include the interior cabin of the vehicle in which the transceiver is located as well as a surrounding area. For instance, the proximity of the transceiver may be an area defined by a radius of a circumference where the radius extends from the transceiver. As described below, the transceiver and a network device within proximity to the transceiver may communicate via an exchange of data, such as in the form of a wireless message. Based on the exchanged data, the policy enforcement application operating on the network device may implement a set of policies to restrict or limit the use of the network device when operating in the vehicle. In some embodiments, the transceiver may be located at a position within an interior cabin of a vehicle that is in close proximity to a driver's seat or to the steering wheel relative to other seats within the vehicle. For example, the transceiver may be affixed to the dashboard behind the steering wheel or in line with a driver's seat. In other examples, the transceiver may be affixed to the ceiling of the vehicle above the steering wheel or the driver's seat. In yet other embodiments the transceiver may be affixed to an upper left corner, a lower left corner or generally the left side of the vehicle's windshield relative to the driver's perspective.

The policy enforcement system may also monitor use, or attempted use, of a network device. For example, the policy enforcement application may monitor motion of the network device and determine whether such motion corresponds to a phone handling event, i.e., where the network device is being handled by a person. The policy enforcement application may also monitor the speed at which the network device is traveling to determine whether the set of policies should remain implemented or be released (e.g., no longer implemented). In some embodiments, the policy enforcement application may obtain data from the transceiver, where such data may be utilized by the policy enforcement application, in addition to the speed at which the network device is traveling, to determine whether the set of policies should remain implemented or be released.

Additionally, as will be discussed in further detail below, the policy enforcement system may perform operations that determine which network device of a plurality of network devices is a driver device on which a set of policies is to be implemented when the vehicle is in operation.

The policy enforcement system may perform additional operations and/or functionalities not explicitly described above that will become apparent throughout the description below and in view of the corresponding figures.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

As mentioned above, the terms "transceiver" and "wireless transceiver" may be used interchangeably. Additionally, the term wireless transceiver refers to an electronic device configured to transmit and/or receive a wireless signal. The wireless transceiver may transmit data using any wireless technology, examples of which may include, but are not limited or restricted to, WI-FI®, BLUETOOTH®, BLUETOOTH® Low Energy (BLE), radio waves (e.g., radio-frequency identification), one or more beacons, etc., wherein transmission is performed by one or more wireless communication modules (e.g., a WI-FI® communication module, a BLUETOOTH® communication module, etc.). In one embodiment, a wireless transceiver may refer to a communication interface of the center console of an automobile. In a second embodiment, a wireless transceiver may refer to a standalone electronic device that provides a wireless communication interface.

As used herein "BLUETOOTH®" may refer to either BLUETOOTH® or BLE protocols/communications, where a protocol utilizing BLUETOOTH® may include (i) transmission of radio waves using a 2.4 Gigahertz (GHz) industrial, scientific and medical (ISM) band, and (ii) be configured to establish a one-to-one communicatively coupling between two network devices configured with BLUETOOTH® modules. Additionally, a WI-FI® module may operate using a communication protocol that includes transmitting radio waves to form one of a wireless local area network (WLAN), a line-of-sight network, or an ad hoc network and in some embodiments, may operate in accordance with technical standards promulgated and/or maintained by the Institute of Electrical and Electronics Engineers (IEEE) (e.g., IEEE 802 standards).

The term "computerized" generally represents that any corresponding operations are conducted by hardware in combination with software and/or firmware.

The term "network device" may be construed as a physical, electronic device or a virtual electronic device that is based on the execution of one or more software modules. The network device may be communicatively coupled to a public network such as the Internet or a private network such as a wireless data telecommunication network, wide area network, a type of local area network (LAN), or a combination of networks. Examples of the network device may include, but are not limited or restricted to, a physical electronic device (e.g., a personal computer such as a desktop, laptop, tablet or netbook; a mobile phone; a standalone appliance; a sensor; etc.). A network device may feature a plurality of electronic components, including one or more hardware processors (generally referred to as "processor"), at least one non-transitory storage medium, and an (network and/or I/O) interface. These components may be encased in a housing, which may be made entirely or partially of a rigid material (e.g., hard plastic, metal, glass, composites, or any combination thereof) that protects these components from certain environmental conditions.

The term "message" generally refers to any type of signaling such as wireless signaling including a beacon signal. Alternatively, the message may be information in a prescribed format and transmitted in accordance with a suitable delivery protocol. Hence, each message may be in the form of one or more packets, frames, or any other wireless signaling having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture—Policy Enforcement System

Referring to FIG. 1A, an exemplary illustration of a deployment of a policy enforcement system in connection with a first vehicle is shown. The policy enforcement system 100 includes a policy enforcement server system 102, a network device sensor 104 (also referred to herein as a "wireless transceiver") and an application 108. As illustrated, the policy enforcement system 100 is deployed in connection with the vehicle 106 wherein the wireless transceiver 104 and a network device 110 having the application 108 installed thereon are located within the vehicle 106. In one embodiment as illustrated, the policy enforcement server system 102 is in communication with the application 108 through the network device 110. However, in other embodiments, each of the components of the policy enforcement system 100 are in communication and operate collectively to enforce one or more sets of policies.

In particular, at a high-level, the wireless transceiver 104, the application 108 and the network device 110 perform operations to determine whether the vehicle 106 is moving and whether a set of policies is to be implemented with respect to the network device 110 based on any detected movement of the vehicle 106. In various embodiments, the application 108 may obtain sensory data from components of the network device 110 in order to determine movement (e.g., from an accelerometer and/or from a GPS unit). Alternatively, or in addition to, the wireless transceiver 104 may capture movement data via an accelerometer and/or vibration data via a vibration sensor. As will be discussed below, the movement/vibration data may be provided to the application 108 and be utilized by the application 108 in determining whether implementation of the set of policies is to be continued. As used herein, sensory data refers to any data associated with data obtained through one or more sensors (e.g., accelerometer, GPS unit, gyroscope, vibration sensor, etc.).

Figure 1B:
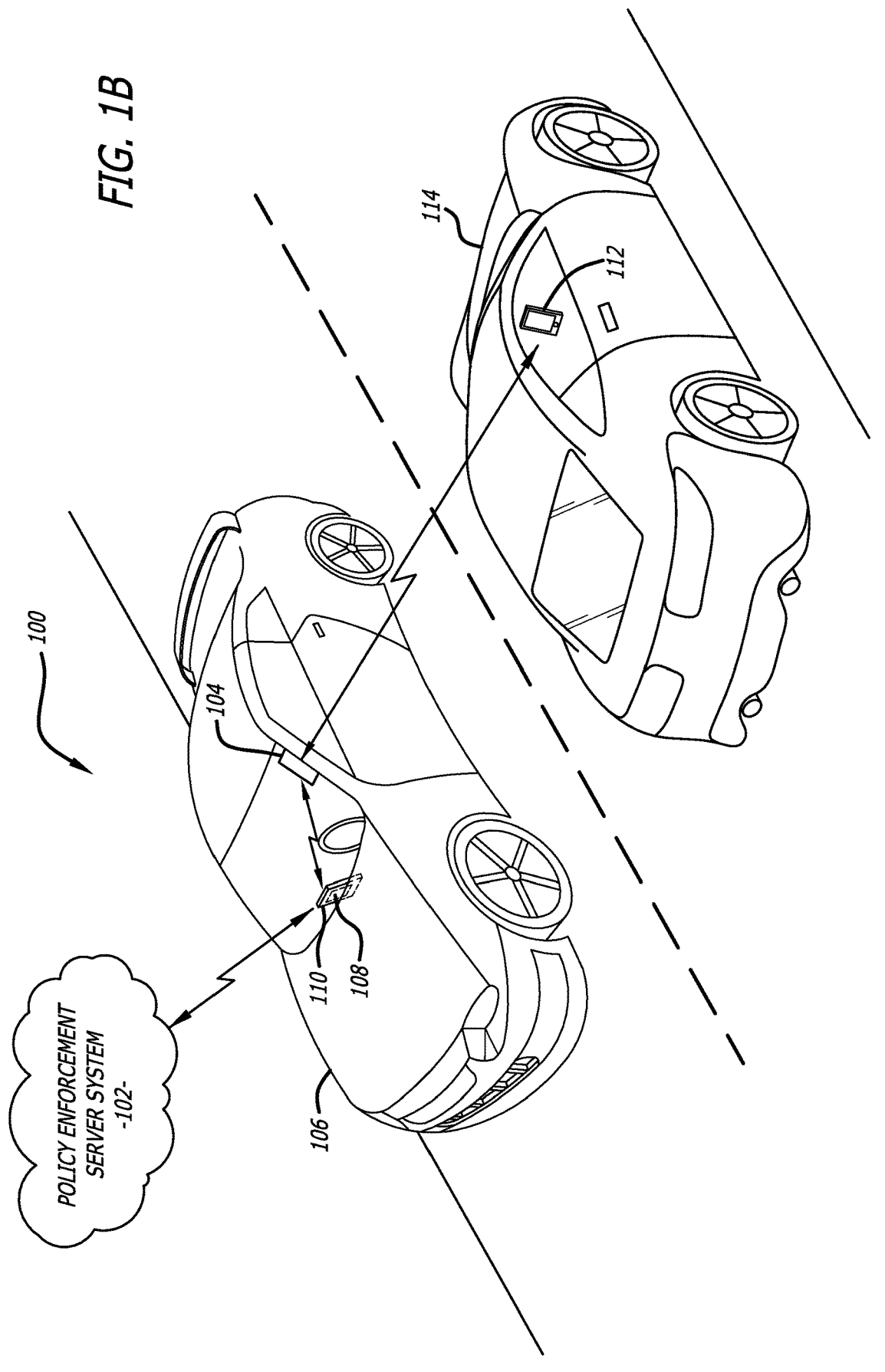
FIG. 1B is a second exemplary illustration of the policy enforcement system of FIG. 1A interacting with a network device of a second vehicle.
Figure 2:
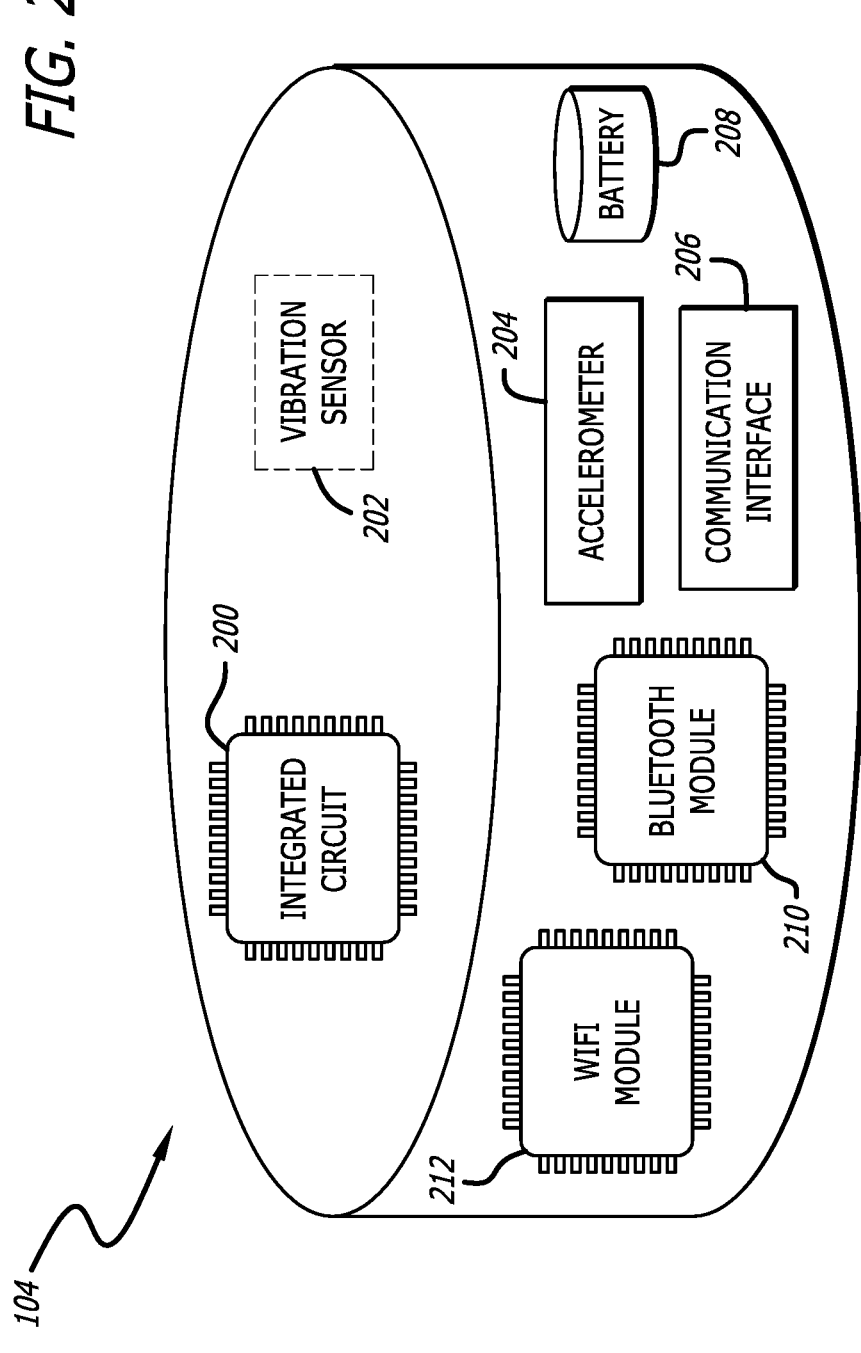
FIG. 2 is an exemplary block diagram of a wireless transceiver of the policy enforcement system of FIG. 1A.

Referring now to FIG. 1B, a second exemplary illustration of the policy enforcement system of FIG. 1A interacting with a network device of a second vehicle is shown. FIG. 1B provides a similar illustration as FIG. 1A in which the policy enforcement system 100 is deployed in connection with the vehicle 106. However, FIG. 1B further illustrates that the policy enforcement system 100 may interact with network devices located in other vehicles (e.g., the network device 112 located within the vehicle 114). As discussed above, each network device may transmit a signal at regular time intervals including certain information, such as a Universally Unique Identifier (UUID), that enables logic included within the wireless transceiver ("wireless transceiver logic") to identify each network device. In some embodiments, the wireless transceiver logic may be programmed into an integrated circuit, as seen in FIG. 2. As will be discussed below with respect to FIGS. 4-5B, the wireless transceiver may form one or more lists identifying detected network devices in order to assess the content of the list(s) against a set of policies and/or driver/vehicle guidelines (discussed below), and, when applicable, transmit an alert to an administrator. Although not illustrated, an instance of the application 108 may be installed on the network device 112.

Figure 1C:
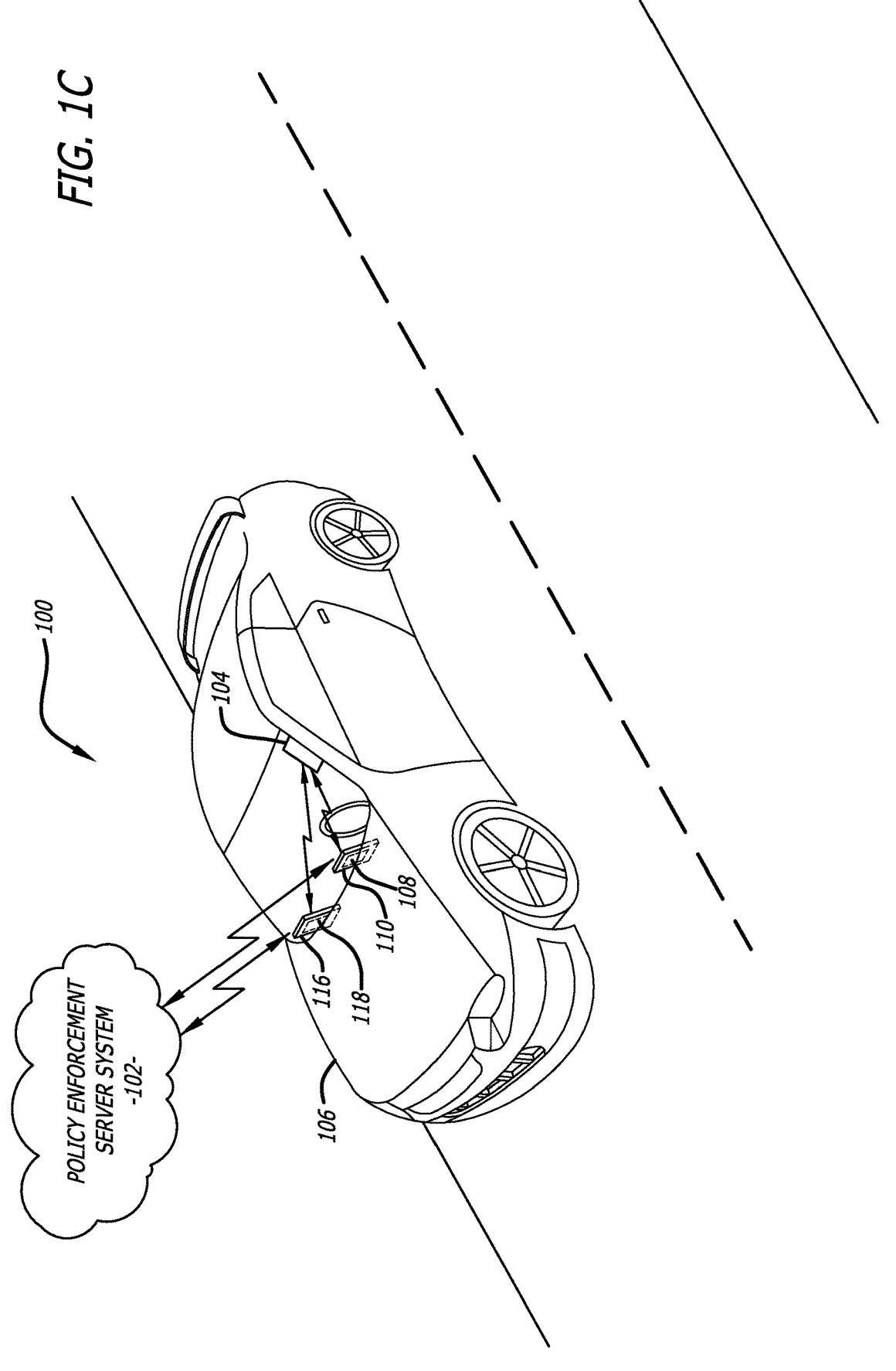
FIG. 1C is a third exemplary illustration of the policy enforcement system of FIG. 1A wherein two network devices are located within the first vehicle.

Referring to FIG. 1C, a third exemplary illustration of the policy enforcement system of FIG. 1A wherein two network devices are located within the first vehicle is shown. FIG. 1C provides a similar illustration as FIG. 1A in which the policy enforcement system 100 is deployed in connection with the vehicle 106. However, FIG. 1C further illustrates that the policy enforcement system 100 may interact with multiple network devices located in a single vehicle (e.g., the network devices 110, 118 located within the vehicle 106). In various embodiments, a first set of policies may be applied by each application to their corresponding network devices, different sets of policies may be applied to each network device, or a first set of policies may be applied to only one of the multiple devices. As will be discussed in detail below, each instance of the policy enforcement application (e.g., application 108 and 116) will attempt to connect to and communicate with wireless transceiver 104. Based on information received from the wireless transceiver 104, each instance of the policy enforcement application will determine whether its corresponding network device is closest to the wireless transceiver 104, and when its corresponding network device is closest to the wireless transceiver 104, the application will apply a set of policies to restrict and/or limit the functionality of its network device. In other embodiments, each instance of the policy enforcement application will determine whether its corresponding network device is within a predetermined distance to the wireless transceiver 104 (e.g., based on the corresponding RSSI value), and when its corresponding network device is within the predetermined distance to the wireless transceiver 104, the application will apply a set of policies to restrict and/or limit the functionality of its network device.

In some embodiments, a set of policies may only be applied to the network device determined to be closest in proximity to the wireless transceiver 104, i.e., with the expectation that such network device is being handled by the driver (i.e., as is seen in FIGS. 1A-1C, the wireless transceiver 104 is coupled to the interior of the vehicle on the side of the windshield opposite a front passenger seat). In alternative embodiments, a first set of policies may be applied to all network devices determined with be located within the vehicle 106 in order to remove all distractions. Predetermined rules or configuration settings may be used to determine which of the above applies. For example, a first rule set (e.g., driver/vehicle guidelines) may be used by the policy enforcement system 100 when deployed in connection with a truck or van within a commercial fleet (e.g., apply a set of policies to all network devices having an instance of policy enforcement application installed thereon). As an additional example, a second rule set may be used by the policy enforcement system 100 when deployed in connection with an individual's personal vehicle (e.g., apply a set of policies only to the network device determined to be located closest to the wireless transceiver, i.e., the network device of the driver).

Referring to FIG. 2, an exemplary block diagram of a wireless transceiver of the policy enforcement system of FIG. 1A is shown. The wireless transceiver 104 (as referenced above, also referred to as a "network device sensor") is shown as having the shape of an ellipse. The wireless transceiver 104 may have a height (e.g., constant in some embodiments but may vary in others) in order to accommodate components housed within. It should be understood that the wireless transceiver 104 may take many different shapes and the disclosure is not intended to be limited to the wireless transceiver 104 having the shape of an ellipse. Examples of other shapes include, but are not limited or restricted to, a triangle, a rectangle, a rhombus or a trapezoid. Further, the wireless transceiver 104 may be, for example, predominantly spherical and include a flat edge configured for attachment to a surface, such as an interior panel of a vehicle. In some embodiments, the wireless transceiver 104 may include a housing, which is made entirely or partially of a hardened material (e.g., hardened plastic, metal, glass, composite or any combination thereof) that protects circuitry and other components within the housing, namely an integrated circuit 200, an optional vibration sensor 202, an accelerometer 204, a communications interface 206, a battery 208 and wireless communication modules (e.g., a BLUETOOTH® module 210 and a WI-FI® module 212). The communication interface 206, under control by a communication interface logic (not shown), enables communications with external network devices, such as network devices and/or a cloud server. In some embodiments, the wireless communication modules may be included as part of (or components of) the communication interface 206. However, the communication interface 206 may also refer to wired or wireless communication modules that implement alternative protocols.

According to one embodiment of the disclosure, the communication interface 206 may be implemented with one or more radio units for supporting wireless communications with other electronic devices. Additionally, or in the alternative, the communication interface 206 may be implemented as a physical interface including one or more ports for wired connectors. The communication interface logic may perform operations to cause the receipt and transmission of electronic data via the communication interface 206.

The integrated circuit 200 may be configured to perform operations including receiving and parsing signals from network devices (e.g., to identify each network device and determine the RSSI of each signal) and performing scans for network devices to determine network devices detected during multiple scans. In one embodiment, a scan may refer to the transceiver 104 initiating a time period ("scan time period") during which it receives and records transmissions from network devices for further analysis, where a transmission may be referred to as a beacon that is automatically transmitted by a network device at regular intervals. A transmission may include certain information such as a device address (such as a UUID or other identifier), an RSSI value, and data (which, in some embodiments, may be an advertisement packet). The scan may conclude when the transceiver 104 no longer records transmissions that were received (or otherwise detected) for the further analysis.

In one embodiment, the further analysis may include "detecting" network devices that are within a predetermined proximity to the transceiver 104 based on the RSSI value of the received and recorded transmission during the scan. For example, the integrated circuit 200 of the transceiver 104 may perform operations including comparing the RSSI of a transmission from each network device against a guideline threshold (where satisfying the comparison indicates detection of a network device within the predetermined proximity) and transmitting an alert to the policy enforcement server system 102 of FIGS. 1A-1C when a plurality of network devices are detected (or when the number of network devices is above a threshold number, which may be based on the number of network devices expected in the vehicle at a given time based on known expected routes, expected drivers and expected passengers). The integrated circuit may also perform operations that cause the communication interface 206 to transmit sensory data to the application 108 and/or the policy enforcement server system 102 (in embodiments in which the policy enforcement server system 102 is in communication with wireless transceiver 104). Additional operations performed by the integrated circuit 200 included in the further analysis are discussed throughout, wherein the integrated circuit 200 may be referred to as "wireless transceiver logic" in some embodiments.

In embodiments in which the wireless transceiver 104 includes the vibration sensor 202, the vibration sensor 202 is configured to perform operations including detecting and recording vibration. As will be discussed below, the vibration sensor 202 may detect vibration of a vehicle and the wireless transceiver 104 may transmit a signal to a network device (e.g., the network device 110) to be parsed and analyzed by the application 108. The application 108 may then utilize the vibration data in determining whether to implement, or withdraw implementation of, a set of policies with respect to the network device. The accelerometer 204 performs operations including detecting and recording acceleration (e.g., movement). As will be discussed below, the accelerometer 204 may detect acceleration of a vehicle and the wireless transceiver 104 may transmit a signal to a network device (e.g., the network device 110) to be parsed and analyzed by the application 108. The application 108 may then utilize the acceleration data ("movement data") in determining whether to implement, or withdraw implementation of, a set of policies with respect to the network device.

In embodiments in which the vibration sensor 202 is not included in the wireless transceiver 104, the wireless transceiver 104 may obtain sensory data from the accelerometer 204 and perform operations, via logic, that simulate the functionality of a vibration sensor. This functionality is simulated via one of several available operating modes of the accelerometer 204 by utilizing a method that recognizes both positive and negative acceleration, and generates an interrupt when the value is greater than a predetermined threshold. The value of acceleration represents movement in any of the X, Y, or Z directions, and/or any combination thereof. Each interrupt lasts for a calculated length of time using the formula: $1/ODR$, with Output Data Rate (ODR) representing a predetermined frequency, the value of which is configured and stored in control registers.

In some embodiments, the movement/vibration data may be a byte within a signal transmitted from the wireless transceiver to the network device at specified time intervals (e.g., every 10, 15 or 30 seconds). In some embodiments, the byte comprises a series of bits, with each bit indicating a movement/vibration status for each time interval. As one illustrative example, the signal may include the following series of bits as shown and described in the following Table 1.

TABLE 1

| Interval | Bit series | Status of last interval |
|----------|------------|-------------------------|
| $time_0$ | 0000 0001 | movement/vibration detected |
| $time_1$ | 0000 0011 | movement/vibration detected |
| $time_2$ | 0000 0111 | movement/vibration detected |
| $time_3$ | 0000 1110 | no detection |
| $time_4$ | 0001 1101 | movement/vibration detected |
| $time_5$ | 0011 1011 | movement/vibration detected |
| $time_6$ | 0111 0111 | movement/vibration detected |
| $time_7$ | 1110 1111 | movement/vibration detected |

Each interval may comprise 10 seconds and the delay time for withdrawing implementation of the set of policies may be 80 seconds. Therefore, once the application detects movement and implements the set of policies, the application will monitor the bit series received in the signal from the wireless transceiver and continue implementation of the policy until either (1) the bit series reads "0000 0000" (i.e., no movement for 80 seconds), or (2) the application no longer detects the presence of the wireless transceiver. In one embodiment, the status of "no detection" at $time_3$ may be a result of the vehicle stopping at a traffic sign.

As discussed herein, withdrawal of the implementation of the set of policies refers to the application of the policy enforcement system returning the network device to its unrestricted or unlimited operating state (e.g., full access to all applications is provided, or at least the same access is provided that was available prior to implementation of the set of policies).

In some embodiments, the battery 208 may be a single use battery such that upon depletion of its energy store, the wireless transceiver 104 may be disposed of. In alternative embodiments, the battery 208 may be one of the following rechargeable battery types, nickel cadmium (NiCd), Nickel-Metal Hydride (NiMH), Lithium Ion (Li-ion), Lithium Ion Polymer (Li-ion polymer), etc.

III. General Methodologies—Policy Enforcement System

Referring to FIG. 3, a flowchart illustrating an exemplary process of implementing and monitoring a set of policies by a policy enforcement application of the policy enforcement system of FIG. 1A is shown. Each block illustrated in FIG. 3 represents an operation performed in the method 300 of applying a set of policies to a network device and monitoring the network device according to at least a subset of the set of policies. In some embodiments, a set of policies may include multiple subsets (i.e., less than the whole). In some such embodiments, the multiple subsets may include a first subset that is directed to restricting the functionality of the network device and a second subset that is directed to monitoring instructions and applicable thresholds. For example, implementation of the first subset of policies may result in removal of icons from the display screen of a mobile device (see FIGS. 5A-5B) in order to restrict functionality of the mobile device. Additionally, implementation of the second subset of policies may cause logic associated with the policy enforcement system (i.e., an application installed on a network device) to monitor certain aspects (e.g., motion via a gyroscope and/or accelerometer).

Referring to the diagram of FIG. 3, in one embodiment, it is assumed that prior to the beginning of the method 300, the application of the policy enforcement system has been installed on a network device (e.g., a mobile device) and a network device sensor (e.g., a wireless transceiver) has been installed or placed within a vehicle. Thus, the method 300 commences when the application processing on the network device detects (i) movement above a predetermined speed threshold (e.g., 5, 10, 15 mph), and (ii) the presence of the wireless transceiver (block 302). In some embodiments, the application obtains sensory data from an accelerometer of the network device in order to determine movement (i.e., acceleration) or from a vibration sensor. Alternatively, or in addition to, the application may obtain sensory data from a GPS unit of the network device in order to determine movement. The presence of the wireless transceiver may be detected based on a signal transmitted from the wireless transceiver in response to a beacon signal transmitted by the network device. The application and wireless transceiver logic then engage in communication in order to determine communication methods and protocol (e.g., a frequency on which to communicate as discussed below). In some embodiments the sensory data obtained from the network device sensor is coupled with the sensory data obtained from the network device to perform a "handshake" that confirms the presence of a wireless transceiver, which prompts the application to implement a set of policies to the network device to restrict and/or limit functionality of the network device. As used herein, the term "handshake" refers to the exchange of information between two devices in order to authenticate one or both of the devices.

In response to detecting (i) movement above a predetermined speed threshold, and (ii) the presence of the wireless transceiver, the application determines whether the network device on which the application is processing is the closest network device to the wireless transceiver (304). FIG. 3 illustrates the flow of method 300 when the application determines the network device on which the application is processing is the closest network device to the wireless transceiver.

Responsive to determining the network device on which the application is processing is the closest network device to the wireless transceiver, the application implements a set of policies, wherein at least a first subset of the policies may restrict or limit functionality of the network device (block 306). As referenced above, the application may perform operations that result in limiting or restricting the functionality of the network device, which may include removing icons from a display screen of the network device as indicated by the first subset of policies. For example, as seen below in FIGS. 5A-5B, icons associated with certain applications running on the network device may be removed to prevent use of the application (e.g., mail, messaging, camera, etc.). Other methods of restricting use of the network device have also been contemplated with examples including, but not limited or restricted to, shading out the icons, shrinking the icons (e.g., altering icons appearance and preventing the opening of the application), disabling and/or delaying notifications, disabling and/or delaying receipt or transmission of data, etc. Other examples of restricting or limiting use of the network device are discussed above and equally applicable in this embodiment.

The method 300 then continues with additional operations that may be performed in parallel or in a concurrent manner (i.e., at least partially overlapping in time); however, there is no such requirement. In further response to detecting (i) movement above a predetermined speed threshold, and (ii) the presence of the wireless transceiver, the application causes the transmission of a signal to the wireless transceiver instructing the wireless transceiver to scan for other network devices (block 308). The scan for other network devices by the wireless transceiver may be done to determine the number of network devices within the vehicle (or within a particular physical region surrounding the wireless transceiver in other non-vehicle deployments). For instance, certain vehicle/driver guidelines may set forth an allowed number of network devices within a vehicle, potentially at certain times of the day, wherein an alert may be transmitted when the vehicle/driver guideline is violated. In other instances, one or more of the components of the policy enforcement system may trigger certain policies or alerts based on what network devices are detected, optionally depending on the time. For example, when the policy enforcement system is deployed within a set of corporate vehicles, as each network device's UUID is received by the wireless transceiver, wireless transceiver logic may determine whether any network devices detected are associated with employees, and whether the presence of multiple employees (or otherwise other network devices) is permitted under the applicable vehicle/driver guidelines and/or set of policies to be implemented.

Additionally, in further response to detecting (i) movement above a predetermined speed threshold, and (ii) the presence of the wireless transceiver, the application implements a first subset of policies to the network device thereby restricting or limiting functionality of the network device, as discussed above (block 310). Additionally, the application may monitor sensory data and apply a second subset of policies to the sensory data.

Following the implementation of the second subset of policies and responsive to determining that monitored sensory data violates one or more policies of the second subset of policies, the application causes performance of operations resulting in the transmission of an alert or signal to administrator (block 312). As used herein, violation of a policy may refer to detection of use or an attempted use of the network device (e.g., handling the network device while operating the vehicle, placing/receiving or attempting to place/receive a call by handling the network device, etc.) For instance, the application may cause transmission of the alert or signal to the policy enforcement server system 102 of FIG. 1A, which may in turn transmit an alert or signal to an administrator. Additionally, the alert or signal may be reviewed as part of a dashboard display (not shown).

Figure 4:
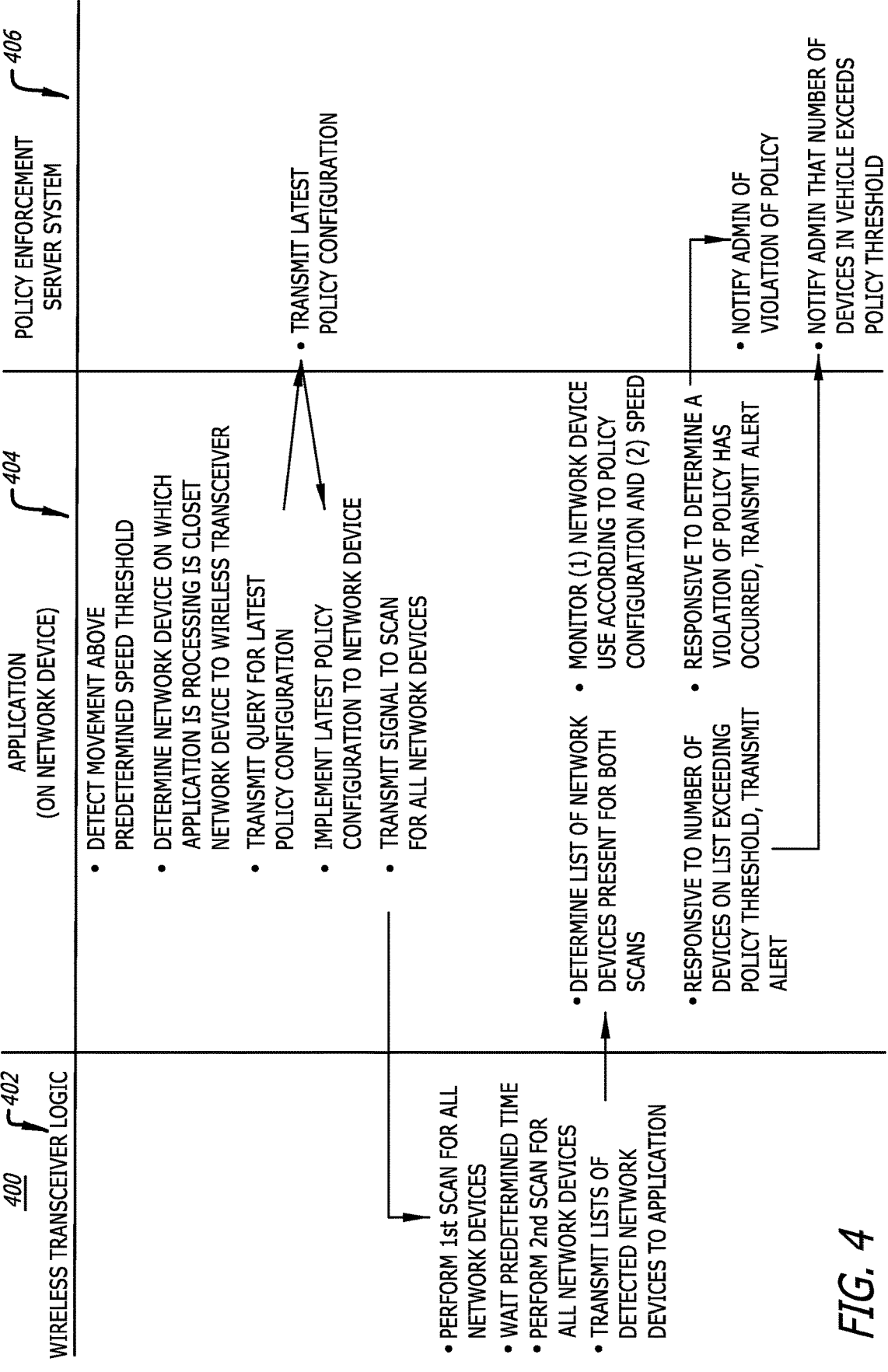
FIG. 4 is an operational flow diagram illustrating operations performed in the process of FIG. 3.

Referring now to FIG. 4, an operational flow diagram illustrating operations performed in the process of FIG. 3 is shown. Specifically, the operational flow diagram includes three columns, one representing each main component of the policy enforcement system: the wireless transceiver logic (column 402); the application (column 404); and the policy enforcement server system (column 406). Each bullet point within a column represents an operation (or operations) performed by the component corresponding to the column. Further, each arrow indicates the transmission of data from a first component to a second component. In some embodiments, the assumptions discussed above with respect to FIG. 3 are equally applicable with respect to FIG. 4.

The operational flow diagram illustrates one embodiment of a process of applying and monitoring a set of policies by the policy enforcement system of FIG. 1A may begin when the application 108 detects movement above a predetermined threshold. Responsive to the detection of movement above the predetermined threshold, the application 108 determines whether the network device on which it is processing is the closest network device to the wireless transceiver 104.

When the application 108 determines whether the network device on which it is processing is the closest network device to the wireless transceiver 104, the application 108 may then transmit a query to the policy enforcement server system 102 for the latest policy configuration (i.e., set of policies to implement). As an alternative, the application 108 may retrieve and utilize the latest received policy configuration from a policy configuration data store, not shown, that is either stored locally on a network device on which the application 108 is operating, i.e., the network device 110, or is otherwise accessible to the application 108.

Following receipt of the request from the application 108, the policy enforcement server system 102 transmits the latest policy configuration to the application 108. In some embodiments, the policy enforcement server system 102 parses the request to identify the network device 110 (and optionally the corresponding user and vehicle, if such data is included in a data store accessible by the policy enforcement server system 102. The policy enforcement server system 102 may then generate a message including the latest policy configuration for transmission.

Following receipt of the message from the policy enforcement server system 102, the application 108, performs several operations which may be in any order. The following operations may also be performed in parallel and include (i) implementing the latest policy configurations with respect to the network device, and (ii) transmitting a signal to the wireless transceiver 104 to be parsed by wireless transceiver logic operating thereon instructing the wireless transceiver logic to perform a scan for additional network devices. Additionally, following the implementation of the latest policy configuration, the application 108 monitors use of the network device according to the latest policy configuration and monitors speed (e.g., of the vehicle 106). Responsive to determining that a violation of the latest policy configuration has occurred, the application 108 may transmit an alert to the policy enforcement server system 102.

Referring to the wireless transceiver 104's receipt of the instructions to scan for additional network devices, the wireless transceiver logic performs a first scan for all network devices (e.g., receives transmissions (beacons) as discussed below) and records identifiers of all detected network devices (and optionally RSSI values of the beacons). The wireless transceiver logic then waits a predetermined time before performing a second scan and recording identifiers of all detected network devices. Following completion of the first and second scans, the records of detected network devices (i.e., a first list and a second list), are transmitted to the application 108, which compares the first list and the second list to determine network devices detected during each scan (i.e., present on both lists). Responsive to the number of network devices detected during both scans exceeding a policy threshold, the application 108 causes transmission of an alert to the policy enforcement server system 102. It should be noted that the determination as to whether a detected number of network devices by the wireless transceiver logic may be based on driver/vehicle guidelines. It should be noted that in some embodiments, the comparison of the lists may be performed by the wireless transceiver logic. Additionally, the first list may be transmitted to the application 108 following the completion of the first scan, there is no requirement that transmission of the first list be performed after completion of the second scan. Additionally, the disclosure is not limited to only two scans. Instead, a plurality of scans may be performed, where additional scans may improve reporting accuracy of detected network devices.

Referring again to column 406 and operations of the policy enforcement server system 102, upon receiving either an alert indicating a policy violation from the application 108 and/or an alert indicating the number of detected network devices during both scans of the wireless transceiver logic, the policy enforcement server system 102 may notify an administrator. Notice to the administrator may be through a message such as a short message service (SMS) message, a multimedia message service (MMS), email, etc. Alternatively, or in addition, notice to the administrator may be provided via (i) a dashboard and/or (ii) a software application operation on a network device (e.g., an "app" operating on a mobile phone or a tablet).

Figures 5A, 5B:
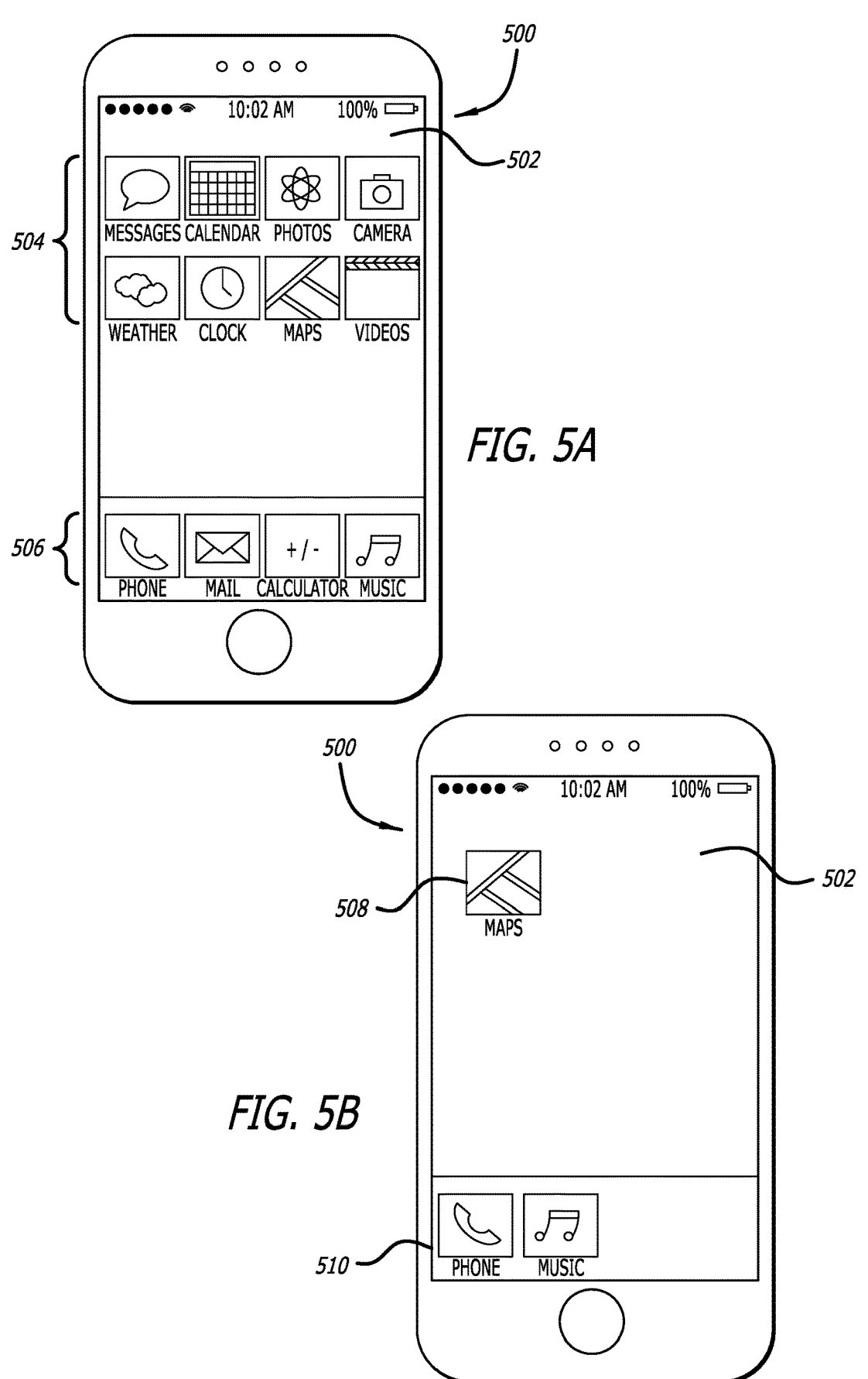
FIG. 5A is an illustration of a network device prior to the implementation of a set of policies by a policy enforcement application of the policy enforcement system of FIG. 1A.
FIG. 5B is an illustration of the network device of FIG. 5A following the implementation of a set of policies by the policy enforcement application of the policy enforcement system of FIG. 1A.

Referring to FIG. 5A, an illustration of a network device prior to the implementation of a set of policies by a policy enforcement application of the policy enforcement system of FIG. 1A is shown. FIG. 5A illustrates a network device 500 (e.g., a mobile device) in a first state wherein a display screen 502 has rendered thereon a set of home screen icons 504 and a set of toolbar icons 506. The first state is one in which a set of policies directed at restricting or limiting functionality of the mobile device 500 has not been implemented. For instance, the mobile device 500 may be in the first state when not within a vehicle.

Referring to FIG. 5B, an illustration of the network device of FIG. 5A following the implementation of a set of policies by the policy enforcement application of the policy enforcement system of FIG. 1A is shown. FIG. 5B illustrates the mobile device 500 in a second state wherein the display screen 502 has rendered thereon a modified set of home screen icons 508 and a modified set of toolbar icons 510. The second state is one in which a set of policies directed at restricting or limiting functionality of the mobile device 500 has been implemented resulting in the removal of predetermined icons from the display screen 502. As referenced above, the set of policies are directed to restricting or limiting functionality of a mobile device, which may include, for example, restricting use of certain applications on the mobile device in order to reduce distractions (e.g., weather, clock, messages, calendar, photos, camera, videos, etc.). As discussed above, the set of policies may be implemented by an application that is a component of the policy enforcement system and installed on the mobile device 500. Specifically, the set of policies may be implemented to remove icons from a mobile device's display screen when the mobile device is within a moving vehicle, and more specifically, the mobile device is determined by the policy enforcement system to be the driver's mobile device (or at least the closest mobile device to the driver). In some embodiments, the set of policies may be applied by the policy enforcement system of FIG. 1A to a plurality of networks devices, such as the network devices within a region incorporating the interior of a vehicle.

IV. Logical Representation—Policy Enforcement Application

Figure 6:
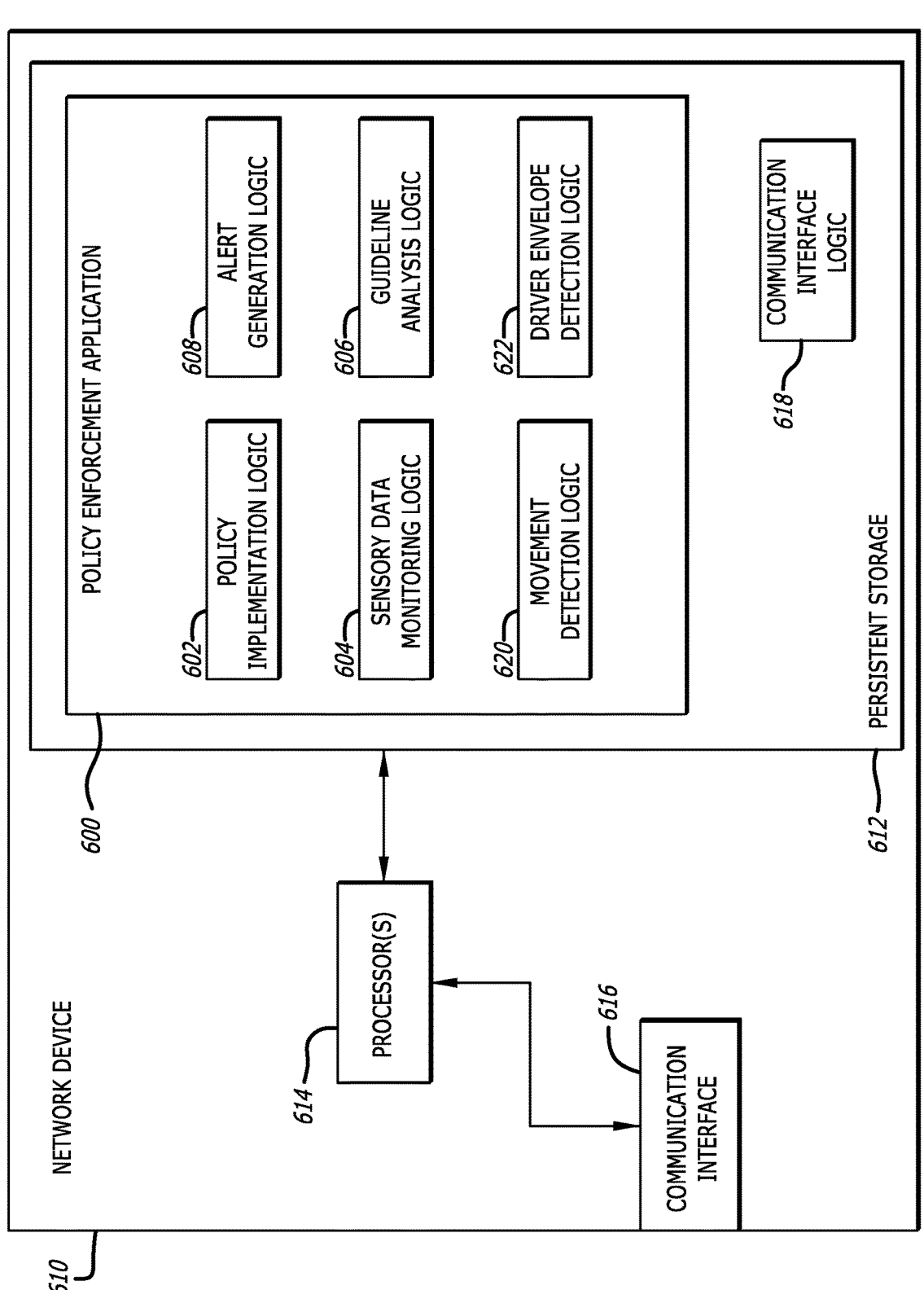
FIG. 6 is an exemplary embodiment of a logical representation of the policy enforcement application of the policy enforcement system of FIG. 1A.

Referring now to FIG. 6, an exemplary embodiment of a logical representation of the policy enforcement application of the policy enforcement system of FIG. 1A is shown. The policy enforcement system application 600 (which may be referred to throughout the disclosure as "the application"), in one embodiment, may be stored on a non-transitory computer-readable storage medium of a network device that includes a housing, which is made entirely or partially of a hardened material (e.g., hardened plastic, metal, glass, composite or any combination thereof) that protects the circuitry within the housing, namely one or more processor(s) 614 that are coupled to a communication interface 616 via a first transmission medium. The communication interface 616, under control by a communication interface logic 618, enables communications with external network devices, such as the wireless transceiver 104 of FIGS. 1A-1C. According to one embodiment of the disclosure, the communication interface 616 may be implemented as a physical interface including one or more ports for wired connectors. Additionally, or in the alternative, the communication interface 616 may be implemented with one or more radio units for supporting wireless communications with other electronic devices. The communication interface logic 618 may perform operations of receiving and transmitting electronic data via the communication interface 616 to enable communications between the policy enforcement system application 600 and network devices via a network (e.g., the internet) and/or cloud computing services.

The processor(s) 614 are further coupled to a persistent storage 612 via a second transmission medium. According to one embodiment of the disclosure, the policy enforcement application 600 may be stored in the persistent storage 612 and include some or all of the following components: a policy implementation logic 602, a sensory data monitoring logic 604, a guideline analysis logic 606 and an alert generation logic 608. The communication interface logic 618 may also be stored in the persistent storage 612. Of course, when implemented as hardware, one or more of these logic units could be implemented separately from each other. In addition, the following data stores, although not illustrated, may be stored locally with respect to the network device 610 and accessible to the policy enforcement application 600: a driver/vehicle guideline data store (DS), a policy configuration DS, a sensory data DS and an alert DS. In some embodiments, one or more of the data stores may be stored remotely and accessible to the policy enforcement application 600. Of course, one or more of the data stores may be implemented together.

According to some embodiments, the policy implementation logic 602 may, upon execution by the processors 614, perform or cause performance of operations including receiving policy configurations from the enforcement policy server system and implementing a set of policies (e.g., provided in the policy configuration), which may include restricting or limiting certain functionality of the network device 610. Various methods or manners of restricting or limiting functionality are discussed above. When a policy violation occurs, the policy implementation logic 602 may provide a signal or other indication to the alert generation logic 608, which is configured to generate alerts.

The sensory data monitoring logic 604 may, upon execution by the processors 614, perform or cause performance of operations including monitoring the handling of and operations performed to/by the network device 610, which may be according to the implemented set of policies and/or driver/vehicle guidelines. The sensory data monitoring logic 604 may provide detected or monitored data to the policy implementation logic 602 for analysis against the implemented set of policies.

The guideline analysis logic 606 may, upon execution by the processors 614, perform or cause performance of operations including analyzing data that is detected or monitored by the sensory data monitoring logic 604 against a set of predetermined driver/vehicle guidelines. The guideline analysis logic 606 may provide a signal or other indication to the alert generation logic 608 when a guideline violation has occurred.

The alert generation logic 608 may, upon execution by the processors 614, perform or cause performance of operations including generating alerts and/or messages to be transmitted to the wireless transceiver and/or the policy enforcement server system, which may in turn generate an alert to be provided to an administrator as discussed above. Additionally, in some embodiments, the policy enforcement server system may merely forward the alert from the alert generation logic 608 to the administrator (or others registered to receive alerts).

The movement detection logic 620 may, upon execution by the processors 614, perform or cause performance of operations including obtaining data that indicates a speed that the network device 610 is traveling and performs a comparison between the data that indicates a speed and a predetermined speed threshold. As one example, the data that indicates a speed may be data from a GPS unit of the network device 610. In some embodiments, the predetermined speed threshold may be 5 miles per hour (mph). In other embodiments, the predetermined speed threshold may be 15 mph. However, it should be understood that these are merely illustrative examples and that other thresholds may be utilized. Further, the predetermined speed threshold may be altered (e.g., through updates to the policy enforcement application 600).

The driver envelope detection logic 622 may, upon execution by the processors 614, perform or cause performance of operations including determining whether the network device 610 is within a driver envelope by comparing the RSSI value of the network device 610 to a drive envelope threshold (e.g., −45 dBm), although other threshold values may be utilized. When the network device 610 is considered within the driver envelope, the network device 610 is considered within a proximity to the driver to be a distraction to driving the vehicle. As a result, the driver envelope detection logic 622 may trigger the policy implementation logic 602 to perform the method 300 of FIG. 3 to determine whether to implement a set of policies thereon.

As not all operations performed by the policy enforcement application 600 have been enumerated and discussed with respect to FIG. 6, it should be understood that the disclosure above regarding operations performed by the policy enforcement application 600 may be performed by one or more of the logic modules illustrated in FIG. 6.

As is understood, decibels per milliwatt (dBm) is the unit used in measuring a power level (e.g., signal strength) of an electrical signal and a decibel is a dimensionless unit used for quantifying a ratio between two values. Thus, RSSI values are indicated in dBm, where a stronger signal is indicated by a higher RSSI value (e.g., a RSSI value of −35 dBm indicates a stronger than a RSSI value of −80 dBm).

V. Determination of Wireless Module Disablement

As described above, a policy enforcement application ("application") may be installed and operating on a network device that is within a moving vehicle. In such instances, the application may implement a set of policies to restrict the use of certain functionalities of the network device thereby preventing a driver from utilizing the network device for at least certain tasks during operation of the vehicle. As also discussed above, the application may monitor sensory data of the network device such that when a policy is violated (e.g., the driver attempts to utilize the network device), an alert may be generated and transmitted to an administrator. One illustrative example of an instance when such technology may be advantageous is when the driver is a company employee that drives a corporate vehicle as part of his/her job responsibilities.

However, as the policy enforcement system described above typically utilizes wireless communication for the exchange of data between a transceiver and a network device on which an instance of the application is operating, proper deployment of the policy enforcement system relies on such wireless communication being available. In some instances, this may mean that a wireless communication module (e.g., a BLUETOOTH® module) on the network device is enabled (e.g., "turned on") and otherwise functioning properly.

One common feature of current network devices is the ability to toggle the state of its wireless communication modules. For example, a user is typically capable of enabling or disabling wireless modules of a network device including a BLUETOOTH® module and a WI-FI® module. Thus, to ensure the policy enforcement system is being deployed properly, it would be advantageous to confirm that particular wireless communication modules of a network device are enabled and otherwise operating properly (e.g., transmitting and receiving wireless signals) at certain instances.

For example, when an instance of the application operating on a network device detects that the network device is traveling at a speed greater than or equal to a speed threshold (e.g., 10 or 15 mph), the application attempts to connect to a wireless transceiver that is also a component of the policy enforcement system. Thus, the application searches for the presence of a wireless transceiver in order to determine whether the network device on which the application is operating is within a vehicle that also includes a wireless transceiver. Subsequently, the application determines whether a set of policies should be implemented on the network device in order to limit or restrict its functionality while the vehicle is in operation. In some embodiments, the application searches for the presence of a wireless transceiver through the exchange of communications via a wireless protocol (e.g., BLUETOOTH®); however, when the BLUETOOTH® module of a network device is disabled, the application may not be able to properly determine whether the network device is within a vehicle that also includes a wireless transceiver of the policy enforcement system. Although many examples disclosed herein discuss the use of wireless technology implementing the BLUETOOTH® protocol as a first wireless communication module, other wireless technologies may be used such as short-range wireless technology, device positioning capable technology, mesh enabling technology, point-to-point broadcast capability, and PAN (personal area network) technologies.

Therefore, illustrative systems and methodologies are described below that enable a policy enforcement application operating on a network device to determine whether a particular wireless communication module (e.g., a BLUETOOTH® module) of a network device has been disabled when an instance of the application operating thereon determines that the network device is traveling at a speed that is greater than or equal to a speed threshold in a vehicle that also includes a wireless transceiver of the policy enforcement system.

In some instances, a network device having an instance of the application operating thereon may be located a single vehicle having a transceiver disposed therein. Accordingly, the instance of the application will attempt to connect to the transceiver and determine whether a set of policies should be implemented to restrict or limit the use of the network device. After the determination as to whether to implement the set of policies, the network device may disconnect from the transceiver (e.g., so that other network devices may also try to connect, when applicable, or otherwise to save battery life of the network device and/or the transceiver). After a predetermined wait period, the network device may repeat the attempt to connect to the transceiver to determine the set of policies should still be implemented. Alternatively, in instances in which the application determines that the set of policies is not to be implemented (e.g., the network device is not determined to be the closest network device to the transceiver and is not within the driver envelope), the application may cause the network device to attempt to connect to the transceiver after the predetermined wait period in order to, once again, determine whether the set of policies is to be implemented to restrict or limit the use of the instant network device.

As used herein, the term "driver device" refers to the network device determined to be the network device that is closest to the transceiver, and as a result, closest to the driver. Additionally, the term "driver envelope" refers to an area within a specified proximity to the transceiver, which would indicate that the network device is within a specified proximity to the driver, (i.e., close enough to the driver to cause the driver to become distracted from driving).

As a precursor to the discussion of the method 700 of FIGS. 7A-7D, upon detection of the presence of a transceiver, each network device attempts to connect to the transceiver to determine whether the network device is the only device present, and if not, obtain data corresponding to network device identifier—RSSI value pairings, where the RSSI value corresponds to the signal strength of a packet transmitted by the network device to the transceiver, which is indicative of the physical proximity of the network device to the transceiver. Thus, the proximity of each network device to the transceiver relative to one another may be determined through comparison of RSSI values corresponding to each network device obtained through scans for packets from each network device performed by the transceiver, where a scan may include a specified time period during which the transceiver receives/accepts (and records) transmissions (e.g., beacons) from network devices. Once a network device determines it is the driver device or is within the driver envelope, a method for determining whether to implement a set of policies thereon may be performed. When a network device determines it is not the driver device or within the driver envelope, the network device may monitor its RSSI value as obtained by the transceiver to determine whether the network device has entered the driver envelope.

Additionally, as alluded to above, a network device may be configured to connect to other network devices and communicate therewith using any of a plurality wired or wireless communication protocols such as WI-FI® protocols (802.11ax ("Wi-Fi 6"), 802.11ac wave2, 802.11ac wave1, 802.11n, 802.11g, 802.11a, 802.11b, etc.), BLUETOOH®, etc. Further, in some embodiments discussed herein, a set of policies may include multiple subsets where a first subset that is directed to restricting the functionality of the network device and a second subset that is directed to monitoring instructions and applicable thresholds. Where examples of the first and second subsets are discussed above.

Referring now to FIGS. 7A-7D, a flowchart of a process of determining whether a wireless communications module of a network device has been disabled by the policy enforcement application of FIG. 6 is shown in accordance with some embodiments. Each block illustrated in FIGS. 7A-7D represents an operation performed in the method 700. Prior to performance of the operations of the method 700, it may be assumed that the network device (also referred to as "instant network device") has an instance of the application operating thereon and is located within a vehicle. It may be further assumed that a transceiver, such as the transceiver 104, is also located within the vehicle. Specifically, the transceiver may be affixed to an upper left corner, a lower left corner or generally the left side of the vehicle's windshield relative to the driver's perspective. In other embodiments, the transceiver may be affixed to the dashboard behind the steering wheel or otherwise in line with a driver's seat. In yet other examples, the transceiver may be affixed to the ceiling of the vehicle above the steering wheel or the driver's seat.

The method 700 will be discussed from the perspective of the "instant network device," where the operations of method 700 are performed by an instance of the application operating on the instant network device unless otherwise stated. In some cases, the instant network device may be one of a plurality of network devices located within the vehicle where some operations comprising the method 700 seek to determine whether the instant network device is to be considered the "driver device" on which a set of policies is to be implemented. It is further assumed that the instant network device has exchanged an initial set of messages with the transceiver (e.g., a connection request and an acknowledgement), which serve to at least indicate to the application operating on the network device that the network device may be located within a vehicle.

Figure 7A:
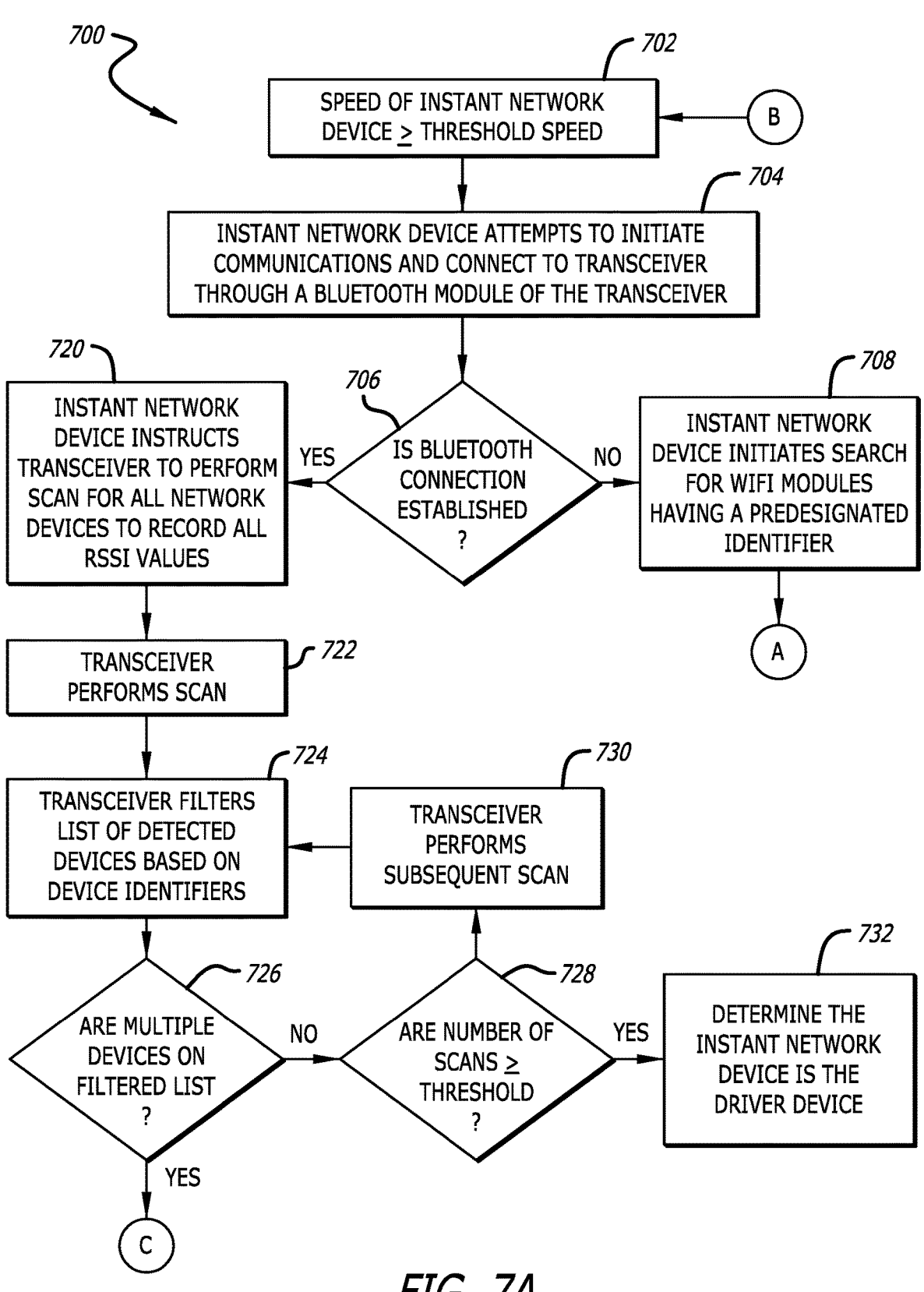
FIGS. 7A-7D provide a flowchart of an illustrative process of determining, by the policy enforcement application of FIG. 6, whether a preferred communication module of a network device located within a vehicle has been disabled or is otherwise improperly functioning.

With reference now to FIG. 7A, the method 700 commences when the speed of the instant network device satisfies a speed threshold comparison and the transceiver indicates movement (block 702). Specifically, the instant network device includes components configured to obtain data indicating speed (e.g., a GPS unit), and the transceiver may include components to detect movement including an accelerometer and a vibration sensor, as seen in FIG. 2. With respect to the transceiver, an acceleration of zero (0) mph and a predetermined continuous time frame of a lack of detected vibration, together, indicate the transceiver is not moving (or otherwise has a speed of zero (0) mph). For example, the vibration sensor performs a vibration detection at regular intervals (e.g., every second) where the vibration sensor records a '1' when vibration is detected and a '0' when vibration is not detected. The combination of an acceleration of zero (0) mph and a continuous string of a predetermined number of 0's (e.g., eight) may indicate to the transceiver and/or the application that the transceiver (and thus the vehicle) is not moving (has a speed of zero (0) mph).

In one embodiment, the movement detection logic 620 obtains data from a GPS unit of the instant network device and determines whether the speed indicated by the GPS unit data satisfies the predetermined speed threshold. For example, the movement detection logic 620 may determine whether the instant network device is traveling at a speed of least 5 mph. Similarly, the movement detection logic 620 may obtain data from the transceiver (obtained from the vibration sensor and the accelerometer) and determine whether the vibration data and acceleration data indicate movement of the transceiver.

Once the speed of the instant network device satisfies the speed threshold and the transceiver indicates movement of the vehicle, the application causes the instant network device to attempt to initiate communications and connect to the transceiver via a first wireless communication module (e.g., a BLUETOOTH® module) (blocks 704, 706).

When a connection (e.g., a communicative coupling) between the instant network device and the transceiver cannot be established via BLUETOOTH® modules of each component, the application causes the instant network device to attempt to initiate communications and connect to the transceiver or directly to a vehicle via a second wireless communication module (e.g., a WI-FI® module) (block 708). In some embodiments, the application may attempt to initiate communications and connection with a Wi-Fi® module that is incorporated within the transceiver (i.e., having a first predesignated identifier, wherein the search includes transmitting a connection request including the first predesignated identifier). In other embodiments, the application may attempt to initiate communications and connection with a Wi-Fi® module that is incorporated directly within a console of the vehicle (i.e., having a second predesignated identifier, wherein the search includes transmitting a connection request including the second predesignated identifier). And in some embodiments, the application may attempt to initiate communications and connection with a Wi-Fi® module that is either: (i) incorporated within the transceiver having the first predesignated identifier; and/or (ii) incorporated directly within the console of the vehicle having the second predesignated identifier (e.g., where the search includes transmitting a connection request including both of the first and second predesignated identifiers).

Figure 7B:
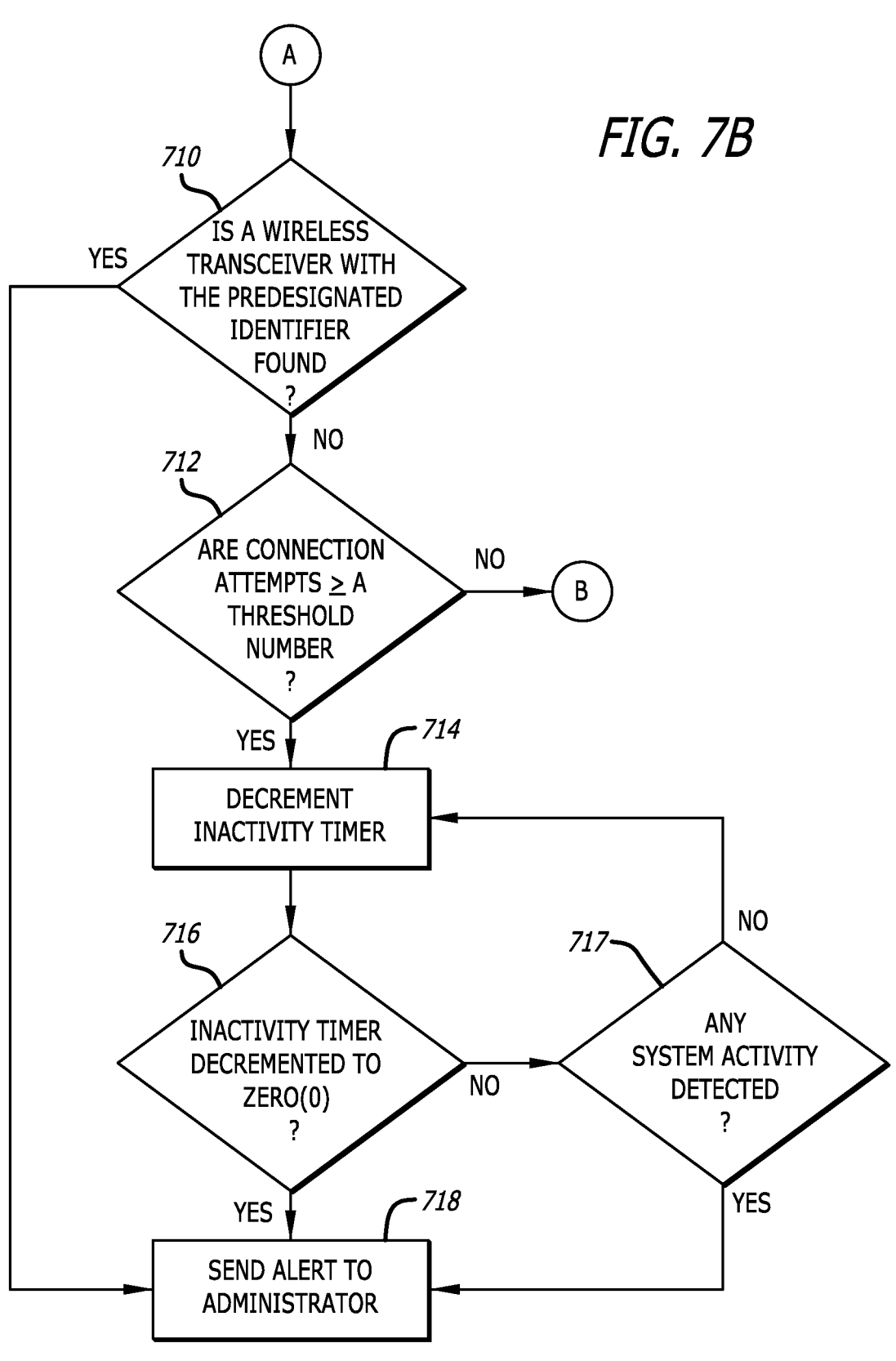

Continuing with reference now to FIG. 7B, when connection to a WI-FI® module having a predesignated identifier cannot be established, the instant network device determines whether the number of attempts to connect to the BLUETOOTH® module of the transceiver are greater than or equal to a threshold number of attempts (blocks 710, 712). When the connection attempts do not satisfy a comparison with the threshold number of attempts (e.g., number of attempts are less than the threshold number of attempts), the method 700 returns to block 702. However, when the connection attempts do satisfy a comparison with the threshold number of attempts (e.g., number of attempts are greater than or equal to the threshold number of attempts), an inactivity timer is decremented and a determination is made as to whether the inactivity timer has been decremented to zero (0) (blocks 714, 716). When the inactivity timer has not decremented to zero (0), the instant network device determines whether any system activity has been detected (e.g., any communications received from either the BLU-ETOOTH® module and/or the WI-FI® module) (block 717). When the system has detected some activity, an alert is transmitted to an administrator indicating no connection was established with either of the BLUETOOTH® module or the WI-FI® module but some system activity was detected (block 718). When the activity has decremented to zero (0), an alert is transmitted to an administrator indicating no connection was established with either of the BLU-ETOOTH® module or the WI-FI® module and no system activity was detected within the time period corresponding to the inactivity timer (block 718).

One purpose of the inactivity timer is to provide an administrator with an indication whether there has been any system interaction following the inability of a network device to connect to either of a BLUETOOTH® module and a WI-FI® module of the system. When no system interaction is detected, such an alert may indicate a dead battery in the wireless transceiver, that the BLUETOOTH® module of the network device was turned off, the cellular connectivity of the network device was turned off, the wireless transceiver has been physically altered, manipulated, covered or moved, etc.). Such an alert may prompt an administrator to contact the driver and resolve the issue.

When a WI-FI® module having the predesignated identifier for which the instant network device is searching is found, the instant network device determines the BLU-ETOOTH® module of the instant network device has been disabled (or is otherwise turned off or not functioning properly) and transmits an alert to an administrator (blocks 710, 718).

Referring again to FIG. 7A, when a connection between the instant network device and the transceiver is established via BLUETOOTH® modules of each component, the application operating on the instant network device instructs the transceiver to begin a device scan operation (blocks 706, 720). In performing the device scan operation (block 722), the transceiver begins to receive and record transmissions from network devices, as described above at least with respect to FIG. 4. In some embodiments, the scan time period may be a predetermined number of seconds (e.g., 2-5 seconds). The device scan operation may conclude when the instant network device transmits a command to end the device scan operation to the transceiver, where conclusion of the scan may result in the transceiver refusing to receive subsequent transmissions (or at least not record receipt of such as part of results of the scan). In other embodiments, the device scan may conclude automatically after a predetermined time (e.g., the transceiver refuses to receive and record such after a predetermined time that may be either preset as a configuration parameter of the transceiver or may be included in the command to begin a scan).

Following conclusion of the scan (or operating currently during the scan), the transceiver filters the list of detected devices based on device identifiers (block 724). For instance, the filtering operation may remove any duplicate device identifiers from the list (e.g., when the transceiver receives multiple transmissions from a single network device during the scan). Additionally, the transceiver may analyze the list of detected devices to ensure that all detected devices have an instance of the application operating thereon (e.g., ensures all received transmissions include a predefined identifier corresponding to an instance of the application and removes any devices from the list that do not have an instance of the application operating thereon).

Once the list of detected devices has been filtered, a determination is made as to whether multiple devices are present on the filtered list (block 726). For example, the transceiver may determine whether multiple network devices are within range of the transceiver (due to receipt of a transmission for the network device). When the transceiver detects only a single network device (the instant network device), the transceiver determines whether a threshold number of device scan operations have been performed (block 728). In some embodiments, as an alternative to block 726, the transceiver may perform multiple scans regardless of whether multiple devices are detected during a single scan. When the threshold number of scans have not been performed, the transceiver performs a subsequent scan and the method 700 then returns to block 724 (block 730). In some embodiments, the list of detected network devices may be provided to the instant network device following each scan.

When the threshold number of scans have been performed and only the instant network device has been detected, such information is relayed to the instant network device, when the application determines that the instant network device is the driver device (block 732). Once the application determines that the instant network device is the driver device, the method 300 of FIG. 3 is performed to determine whether to implement a set of policies on the instant network device.

Figure 7C:
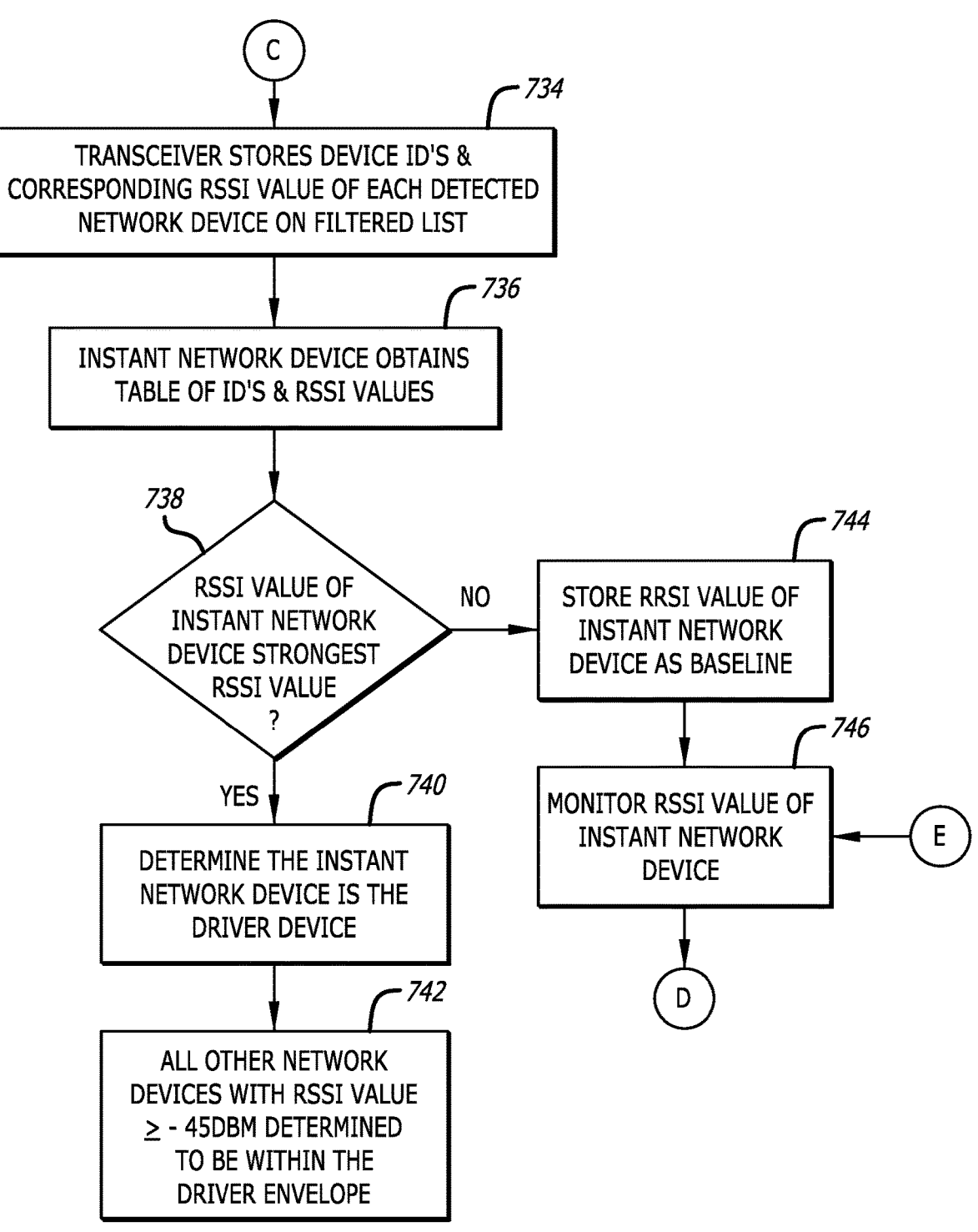
Figure 7D:
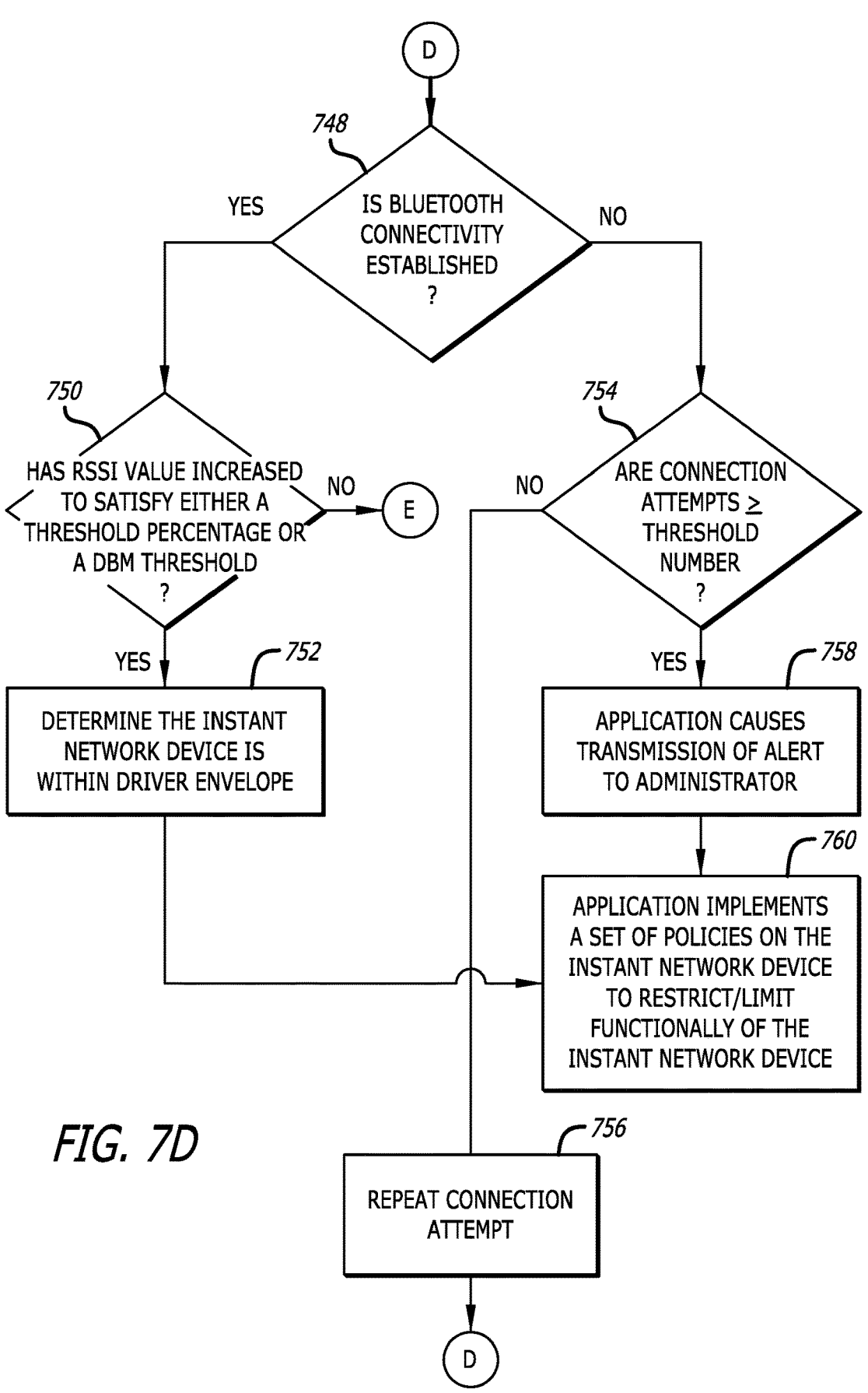

Continuing now with reference to FIG. 7C, when multiple network devices are detected, the transceiver parses each received transmission and stores a network device identifier—RSSI value pairing for each received transmission in a data store, which is then obtained by the instant network device (blocks 726, 734-736). In an alternative embodiment, the transceiver may perform a comparison of the RSSI value of each received transmission to a threshold value (e.g., a dBm value) and, for those RSSI values that satisfy the threshold value comparison, include the network device identifier—RSSI value pairings in a list that is transferred to the instant network device.

The application of the instant network device then determines whether the RSSI value of the instant network device is the strongest RSSI value recorded in the data store (block 738). When the RSSI value of the instant network device is the strongest in the data store, the instant network device is determined to be the driver device and the method 300 of FIG. 3 is performed to determine whether to implement a set of policies on the instant network device (block 740). Additionally, each instance of the application operating on the other network devices present within the vehicle will perform the same method referenced above and determine whether the corresponding network device is within a driver envelope (block 742). Although not the strongest detected RSSI value, a network device may be deemed within the "driver envelope" when the RSSI value corresponding to the network device is at least a threshold value, such as −45 dBm, although other threshold values may be utilized. When a network device is considered within the driver envelope, the network device is considered within a proximity to the driver to be a distraction to driving the vehicle. As a result, the instance of the application operating on a network device within the driver envelope may perform the method 300 of FIG. 3 to determine whether to implement a set of policies thereon.

When the RSSI value of the instant network device is not the strongest detected value, the RSSI value of the instant network device is stored as a baseline RSSI value and the application instance monitors the RSSI of the instant network device (blocks 744-746). In some embodiments, the application may, at regular intervals, transmit a request communication to the transceiver, such as an advertisement packet and/or a request for the RSSI value of the network device. In response, the network device may receive a response communication that includes the RSSI value of the request communication. As a result, the application monitors the RSSI value of the network device.

Additionally, after the determination that the RSSI value of the instant network device is not the strongest detected value, the instant network device may disconnect from the transceiver (e.g., so that other network devices may also try to connect, when applicable, or otherwise to save battery life of the network device and/or the transceiver) (block 748). After a predetermined wait period, the instant network device may repeat the attempt to connect to the transceiver to determine whether the instant network device is within the driver envelope (e.g., see blocks 750, 752).

When a BLUETOOTH® connection is established and the RSSI value of the instant network device is determined to have increased by either a threshold percentage or a value threshold (e.g., in dBms), the instant network device is determined to be within the driver envelope (blocks 748-750). As a result, the instance of the application determines that the instant network device is the driver device (block 752). The application then implements a set of policies, wherein at least a first subset of the policies may restrict or limit functionality of the network device (block 760). However, when a BLUETOOTH® connection is established and the RSSI value of the instant network device is determined not to have increased by either the threshold percentage or the value threshold, the application instance monitors the RSSI of the instant network device (blocks 750, 746).

When a BLUETOOTH® connection is not established, the instant network device determines whether the connection attempts are greater than or equal to a threshold number of attempts (block 754). When the connection attempts are less than the threshold number, a connection attempt is made and a determination is made as to whether a BLUETOOTH® connection is established (blocks 756, 748). When the connection attempts are greater than or equal to the threshold number, The application may generate and forward and alert to an administrator, the policy enforcement server system (or others registered to receive alerts) and the application implements a set of policies, wherein at least a first subset of the policies may restrict or limit functionality of the network device (blocks 758, 760).

Figures 8A, 8B:
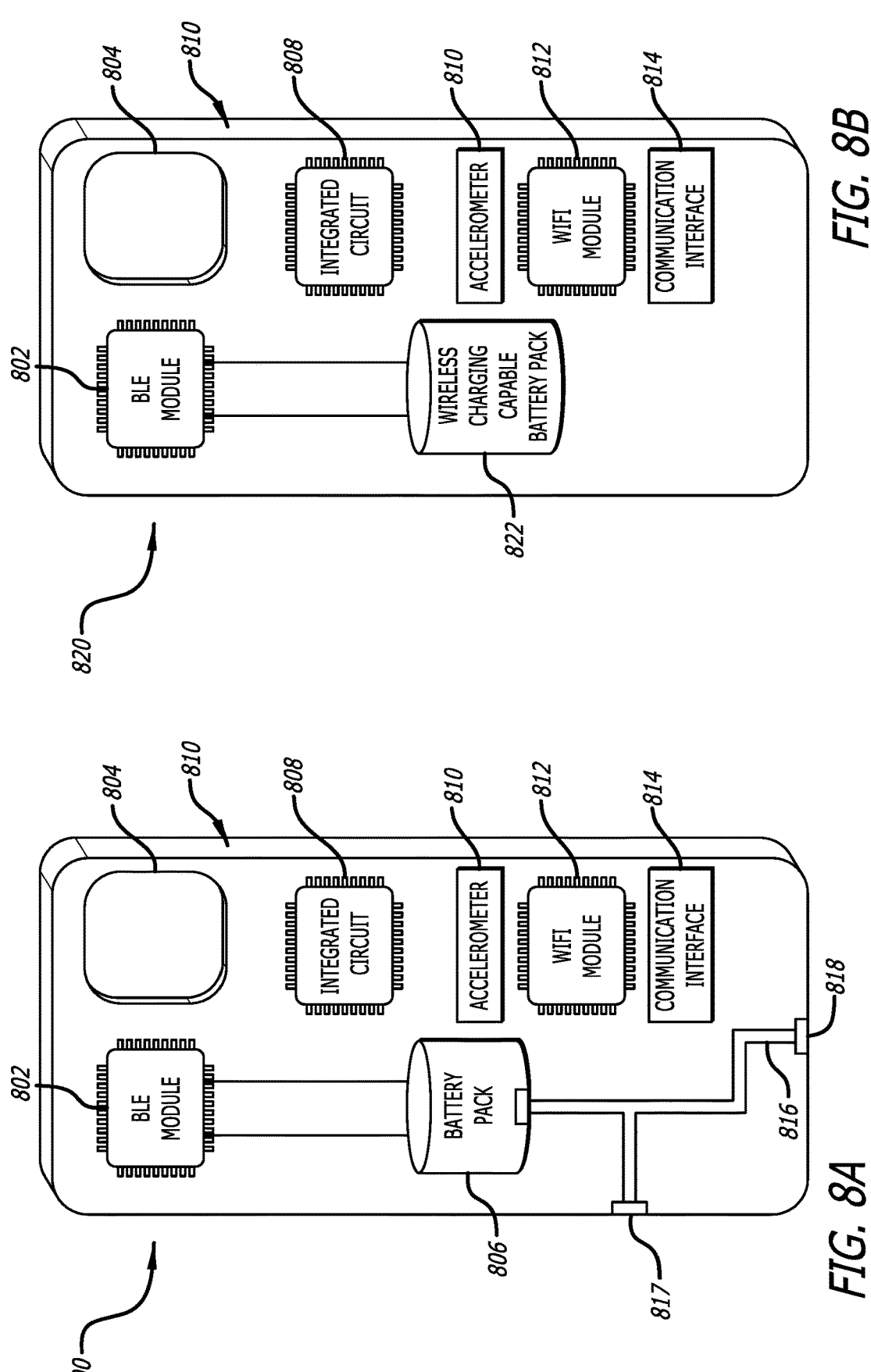
FIG. 8A is a first embodiment of a transceiver network device case including a battery and components providing interoperability with the policy enforcement system of FIG. 1A.
FIG. 8B is a second embodiment of a transceiver network device case including a wireless battery and components providing interoperability with the policy enforcement system of FIG. 1A.

Referring now to FIG. 8A, a first embodiment of a transceiver network device case including a battery and components providing interoperability with the policy enforcement system of FIG. 1A is shown in accordance with some embodiments. FIG. 8A illustrates the transceiver network device case ("transceiver case") 800 configured to be removably coupled to a network device, e.g., a mobile device, a tablet, etc. The transceiver case 800 includes a housing 801 that includes a camera window 804 and configured to house wireless communication modules (e.g., a BLUETOOTH® module 802 and a WI-FI® module 812), a battery pack 806, an integrated circuit 808, an accelerometer 810, a communication interface 814, an electrical connection 816, and a charging port 818. The housing 801 may be made entirely or partially of a hardened material (e.g., hardened plastic, metal, glass, composite or any combination thereof) that protects circuitry and other components within the housing 801).

Numerous components of the transceiver case 800 include components that can, in certain respects, resemble components of the wireless transceiver 104 of FIG. 2. It will be appreciated that all the illustrated embodiments may have analogous features. Relevant disclosure set forth above regarding similarly identified features thus may not be repeated hereafter. Moreover, specific features of the components of the transceiver case 800 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of embodiments discussed in FIGS. 8A-13A. Any suitable combination of the features, and variations of the same, described with respect to the transceiver 104 and components illustrated in any of FIGS. 1A-7D can be employed with the transceiver case 800 and embodiments illustrated in FIGS. 8B-13 and discussed below.

For example, the BLUETOOTH® module 802 may resemble (and in some instances, correspond directly) to the BLUETOOTH® module 210 and the WI-FI® module 812 may resemble (and in some instances, correspond directly) to the WI-FI® module 212. Similarly, the integrated circuit 808 may resemble (and in some instances, correspond directly) to the integrated circuit 200, the accelerometer 810 may resemble (and in some instances, correspond directly) to the accelerometer 204, and the communication interface 814 may resemble (and in some instances, correspond directly) to the communication interface 206.

Additionally, the transceiver case 800 includes the battery pack (or battery) 806, which is configured to provide power to the components of the transceiver case 800 discussed above and to a network device to which the transceiver case 800 is coupled. Specifically, the battery 806 may provide power to the network device via the electrical connection 816 and the charging port 818, where the charging port 818 is an interface that couples with a charging port of the network device. The battery 806 may receive charge via its own charging receptacle 817.

The following provides a brief summary of the functionality of the components of the transceiver network device case as discussed above with comparable or corresponding components as discussed in at least FIG. 2.

The communication interface 816 (which is comparable or corresponds to the communication interface 206), under control by a communication interface logic (not shown), enables communications with external network devices, such as network devices and/or a cloud server. In some embodiments, the wireless communication modules may be included as part of (or components of) the communication interface 816. However, the communication interface 816 may also refer to wired or wireless communication modules that implement alternative protocols.

The integrated circuit 808 (which is comparable or corresponds to the integrated circuit 200), may be configured to perform operations including receiving and parsing signals from network devices (e.g., to identify each network device and determine the RSSI of each signal) via the BLUETOOTH® module 802, the WI-FI® module 812 or the communication interface 814 and performing scans for network devices to determine network devices detected during multiple scans (as defined above). The integrated circuit may also perform operations that cause the wireless communication modules or the communication interface 814 to transmit sensory data to the application 108 processing on the network device 110 and/or the policy enforcement server system. Additional operations performed by the integrated circuit 808 included in the further analysis are discussed throughout, wherein the integrated circuit 808 may be referred to as "wireless transceiver logic" in some embodiments.

The accelerometer 810 (which is comparable or corresponds to the accelerometer 204), performs operations including detecting and recording acceleration (e.g., movement). As will be discussed below, the accelerometer 810 may detect acceleration of a vehicle (through detecting acceleration of the network device 110) and the transceiver case 800 may transmit a signal ("acceleration data" or "movement data") to the network device 110 to be parsed and analyzed by the application 108, which uses such in determining whether to implement, or withdraw implementation of, a set of policies with respect to the network device Referring to FIG. 8B, a second embodiment of a transceiver network device case including a wireless battery and components providing interoperability with the policy enforcement system of FIG. 1A is shown in accordance with some embodiments. The transceiver case 822 include many of the same components as the transceiver case 800 of FIG. 8A and operates in the same manner with respect to its operability within the policy enforcement system of FIG. 1A. Differently than the transceiver case 800, the transceiver case 820 includes the wireless charging battery pack 822 (or wireless charging battery) instead of the battery 806. The wireless charging battery 822 may be configured to (i) receive a charge via wireless charging, and (ii) provide a charge to a network device via wireless charging, when the network device is so configured. The wireless charging may include any of (1) tightly-coupled electromagnetic inductive or non-radiative charging, (2) charging bowls that use loosely-coupled or radiative electromagnetic resonant charging, or (3) uncoupled radio frequency (RF) wireless charging. Further, the wireless charging technology of the wireless charging battery 822 may be in accordance with any wireless charging standard such as those promulgated by the Alliance for Wireless Power (4AWP), the Power Matters Alliance (PMA), or the Wireless Power Consortium (WPC). For example, the technology of the wireless charging battery 822 may be in accordance with the wireless charging standard QI® promulgated by the WPC.

Referring to FIG. 9A, a first embodiment of a transceiver apparatus removably coupled to a network device is shown in accordance with some embodiments where the transceiver apparatus includes a battery and components providing interoperability with the policy enforcement system of FIG. 1A. The transceiver apparatus 900 provides an alternative embodiment to the transceiver cases 800, 822 of FIGS. 8A-8B such that the transceiver apparatus 900 includes many of the same components as FIGS. 8A-8B; however, the transceiver apparatus 900 provides a variation as it is not a case for a network device (e.g., not a protective case). Instead, the transceiver apparatus 900 may, in some embodiments, be configured to provide wireless charging capability to 110 network device, however, such is not required. The transceiver apparatus 900 includes a housing 901 that is coupled to the network device 110 via an adhesive 902. In alternative embodiments, the housing 901 may be coupled to the network device 110 via magnets (FIG. 9B-9C) or via preconfigured structural components (FIG. 9D-9E). The housing 901 houses the battery 903, wireless communication modules (e.g., a BLUETOOTH® module 904 and a WI-FI® module 910), an integrated circuit 906, an accelerometer 908, a charging port 912, and a power indicator 914. The transceiver apparatus 900 may, in some embodiments, be configured to receive a wireless charge for the battery 903 as discussed above with respect to the wireless charging battery 824 and/or include the charging port 912 to couple with an electrical connector (e.g., a cable including a core of conductive materials such electrical is provided to the charging port 912 and subsequently to the battery 903.

The functionality of the components of the transceiver apparatus 900 may provide the same operability with respect to the policy enforcement system of FIG. 1A as embodiments discussed above (e.g., FIGS. 2 and 8A-8B). For instance, the BLUETOOTH® module 904 is comparable or corresponds to the BLUETOOTH® module 802, the WI-FI® module 910 is comparable or corresponds to the WI-FI® module 812, the integrated circuit 906 is comparable or corresponds to the integrated circuit 808, the accelerometer 908 is comparable or corresponds to the accelerometer 810, and the communication interface/charging port 912 provides comparable functionality and operates in a corresponding manner to the communication interface 206 while also being configured to exchange data.

Referring to FIG. 9B, a second embodiment of a transceiver apparatus removably coupled to a network device is shown in accordance with some embodiments where the transceiver apparatus includes a battery and components providing interoperability with the policy enforcement system of FIG. 1A. In particular, FIG. 9B illustrates that the housing 901 may be coupled to the network device 110 via one or more magnets 920. For instance, the magnets 920 may magnetically couple directly to a housing of the network device 110 depending on the material construction of the network device 110. In other embodiments, complimentary magnets may be provided having adhesive on a back side, where the magnets may be adhesively coupled to the housing of the network device 110.

Referring to FIG. 9C, a third embodiment of a transceiver apparatus removably coupled to a network device is shown in accordance with some embodiments where the transceiver apparatus includes a battery and components providing interoperability with the policy enforcement system of FIG. 1A. FIG. 9C illustrates that the housing 901 may be coupled to the network device 110 via one or more magnetic portions 925 (for purposes of clarity, a single magnetic portion is shown), which may be coupled to the network device 110 via adhesive 926. Additionally, the housing portion 901 may include a recessed portion 928 that is configured to align with the magnetic portion 925 such that the recessed portions include a magnetic portion 927 that is complementary to the magnetic portion 925. Thus, coupling of the transceiver apparatus 900 and the network device 110 through alignment of the magnetic portion 925 and the recessed portion 928 creates a magnetic coupling therebetween.

Referring to FIG. 9D, a fourth embodiment of a transceiver apparatus removably coupled to a network device is shown in accordance with some embodiments where the transceiver apparatus includes a battery and components providing interoperability with the policy enforcement system of FIG. 1A. FIG. 9D illustrates that the housing 901 may be coupled to the network device 110 via a twist-to-lock coupling whereby prongs 940A-940C of a male coupling portion 938 are inserted into cavities 936A-936C of receiving portion 932 of a female coupling portion 930 and twisted (e.g., ⅛ or ¼ turn in a first direction, e.g., counterclockwise) causing the two components to be coupled together through friction between the male coupling portion 938 and the female coupling portion 930. As should be understood, the cavities 936A-936C refer to a clearance under the overhangs that extend inwardly from the female coupling portion 930. More specifically, as prongs 940A-940C slide into the cavities 936A-936C, friction therebetween maintains coupling until sufficient force is applied thereby twisting the transceiver apparatus 900 (or the network device 110) in an opposite direction (e.g., clockwise). It should be understood that in the embodiment of FIG. 9D, due to the twist-to-lock coupling, the housing 901 will contact the network device 110 at the center of the male coupling portion 938; thus, the wireless battery 903 is disposed at that location to effect the charging of network device 110. The female coupling portion 930 may be secured to the network device 110 via an adhesive 934 while the male coupling portion 938 may be integrally formed with the housing 901. It should be understood that the disposition of the male and female coupling portions 938, 930 may be reversed such that male coupling portion 938 is disposed (in this embodiment, directly coupled with) the network device 110 while the female coupling portion 930 is integrally formed with and extend from the housing 901 of the transceiver apparatus 900.

Referring to FIG. 9E, a fifth embodiment of a transceiver apparatus removably coupled to a network device is shown in accordance with some embodiments where the transceiver apparatus includes a battery and components providing interoperability with the policy enforcement system of FIG. 1A. FIG. 9E illustrates that the housing 901 of the transceiver apparatus 900 may be structurally coupled with the network device 110. In particular, the housing 901 may include a structural connection component 942 comprised of structural wing attachments 944A, 944B that are configured to grip the sides of the housing of the network device 110.

Referring to FIG. 10, a sixth embodiment of a transceiver apparatus configured to be removably coupled to a network device is shown, the transceiver apparatus includes a battery and components providing interoperability with the policy enforcement system of FIG. 1A in accordance with some embodiments. FIG. 10 illustrates the transceiver apparatus 1000 prior to coupling with the network device 110, where a connector (or interface) 1002 is configured to be received by the charging port 111 of the network device 110. The transceiver apparatus 1000 includes a housing 1001, where the connector 1002 extends outwardly therefrom. The housing 1001 houses a battery 1003, a BLUETOOTH® module 1004, an integrated circuit 1006, an accelerometer 1008, and a WI-FI® module 1010. The housing 1001 may also include a charging port 1012 configured to receive a connector of a cable that provides power thereby charging the battery 1003 (in a similar manner as the optional charging port 912 of FIGS. 9A-9E receives a connector for charging of the battery 903).

The functionality of the components of the transceiver apparatus 1000 may provide the same operability with respect to the policy enforcement system of FIG. 1A as embodiments discussed above (e.g., FIGS. 2, 8A-8B, and 9A-9E). For instance, the BLUETOOTH® module 1004 is comparable or corresponds to the BLUETOOTH® module 802, the WI-FI® module 1010 is comparable or corresponds to the WI-FI® module 812, the integrated circuit 1006 is comparable or corresponds to the integrated circuit 808, and the accelerometer 1008 is comparable or corresponds to the accelerometer 810.

In some embodiments, the transceiver apparatus 1000 may be configured to exchange data with the network device 110 via the connector 1002 and the charging port 111. The data exchanged may include any of the data discussed above such as, for example, sensory data.

Referring to FIG. 11, an embodiment of a transceiver fob apparatus including a battery and components providing interoperability with the policy enforcement system of FIG. 1A is shown in accordance with some embodiments. The transceiver fob apparatus 1100 includes a housing 1101 that may include a split key ring opening for coupling with a key ring (or other attachment device) as shown. The housing 1101, which includes a first side 1101A and a second side 1101B, houses the battery 1102, wireless communication modules (e.g., a BLUETOOTH® module 1104 and a WI-FI® module 1110), an integrated circuit 1106, an accelerometer 1108, and an optional charging port 1112.

The functionality of the components of the transceiver fob apparatus 1100 may provide the same operability with respect to the policy enforcement system of FIG. 1A as embodiments discussed above (e.g., FIGS. 2, 8A-8B, 9A-9E, and 10). For instance, the BLUETOOTH® module 1104 is comparable or corresponds to the BLUETOOTH® module 802, the WI-FI® module 1110 is comparable or corresponds to the WI-FI® module 812, the integrated circuit 1106 is comparable or corresponds to the integrated circuit 808, the accelerometer 1108 is comparable or corresponds to the accelerometer 810, and the charging port 1112 is comparable or corresponds to the charging port 817 of FIG. 8A.

In some embodiments, in which the transceiver fob apparatus 1100 does not include the charging port 1112, the first and second sides 1101A, 1101B may be detachably coupled to each other such that the two sides may be split apart in order to replace the battery 1102. As should be understood, in embodiments in which the transceiver fob apparatus 1100 includes the charging port 1112, the first and second sides 1101A, 1101B may not be configured with the intention of separating and, further, the battery 1102 may be a rechargeable battery.

Referring to FIG. 12A, an embodiment of a transceiver network device stand apparatus removably coupled to an interior of an automobile in a first configuration, the transceiver network device stand apparatus including a battery and components providing interoperability with the policy enforcement system of FIG. 1A is shown in accordance with some embodiments. FIG. 12A shows the transceiver stand apparatus 1200 in a first configuration in which the housing base 1201A is coupled to an interior of an automobile windshield 106A of an automobile 106 via the suction cup attachment 1201B. The transceiver network device stand apparatus 1200 (transceiver stand apparatus) includes a housing 1201 that may include (i) a housing base 1201A, which includes a suction cup attachment 1201B, (ii) an extendable and/or adjustable arm 1201C that may extend distally away from the housing base and/or retract or rotate about a fixed attachment point on the housing base, and (iii) an adjustable grip 1201D. The housing 1201 houses a battery 1202, wireless communication modules (e.g., a BLUETOOTH® module 1204 and a WI-FI® module 1212), an integrated circuit 1206, a vibration sensor 1208, an accelerometer 1210, and a charging port 1214.

The functionality of the components of the transceiver stand apparatus 1200 may provide the same operability with respect to the policy enforcement system of FIG. 1A as embodiments discussed above (e.g., FIGS. 2, and 8A-11). For instance, the BLUETOOTH® module 1204 is comparable or corresponds to the BLUETOOTH® module 802, the WI-FI® module 1210 is comparable or corresponds to the WI-FI® module 812, the integrated circuit 1206 is comparable or corresponds to the integrated circuit 808, the accelerometer 1210 is comparable or corresponds to the accelerometer 810, and the charging port 1214 is comparable or corresponds to the charging port 817 of FIG. 8A. Further, the transceiver network device stand apparatus 1200 may include the vibration sensor 1208, which is configured to perform operations including detecting and recording vibration and may resemble (and in some instances, correspond directly) to the vibration sensor 202. The vibration sensor 1208 may detect vibration of a vehicle and the transceiver network device stand apparatus 1200 may transmit a signal to a network device (e.g., the network device 110) to be parsed and analyzed by the application 108, which is used in determining whether to implement, or withdraw implementation of, a set of policies with respect to the network device.

Referring to FIG. 12B, the transceiver network device stand apparatus of FIG. 12A removably coupled to the interior of an automobile in a second configuration is shown in accordance with some embodiments. FIG. 12B shows the transceiver stand apparatus 1200 in a second configuration in which the housing base 1201A is coupled to a dashboard 106B of the automobile 106 via the suction cup attachment 1201B. Thus, the combination of FIGS. 12A-12B illustrates that the transceiver stand apparatus 1200 couples with an interior of the automobile 106 in multiple configurations and in multiple positions. For instance, the transceiver stand apparatus 1200 may be configured to couple with an interior of a windshield 106A (FIG. 12A) as well as a dashboard 106B (FIG. 12B).

Referring to FIG. 13, a second embodiment of a transceiver apparatus removably coupled to a network device, the transceiver apparatus including a battery and components providing interoperability with the policy enforcement system of FIG. 1A is shown in accordance with some embodiments. FIG. 13 shows the transceiver apparatus 1300 coupled to a network device 110 via the charging port of the network device 110 (the transceiver apparatus 1300 may be merely laying on top of the network device 110 as opposed to adhesively coupled to the housing of the network device 110). The transceiver apparatus 1300 includes a housing 1301 that houses a battery 1302, wireless communication modules (e.g., a BLUETOOTH® module 1304 and a WI-FI® module 1310), an integrated circuit 1306, an accelerometer 1308. An electrical connection 1311 may extend from the housing 1301 to a connector (or interface) 1312, where the connector 1312 may be configured to couple with a charging port of the network device 110. Additionally, in some embodiments, the charging port of the network device 110 may be configured to receive charge through the connector 1312. However, in other embodiments, the transceiver apparatus 1300 may also include a charging port (not shown but similar to charging ports illustrated above, such as the charging port 1214 of FIGS. 12A-12B). The transceiver apparatus 1300 may have a width X, a length Y and a height Z, which may, in some embodiments, be: {X, Y, Z} as {2-2.5 inches, 3-3.5 inches, 0.15-0.25 inches}. However, these dimensions may be altered depending on the sizing of particular components utilized.

The functionality of the components of the transceiver apparatus 1300 may provide the same operability with respect to the policy enforcement system of FIG. 1A as embodiments discussed above (e.g., FIGS. 2, and 8A-12B). For instance, the BLUETOOTH® module 1304 is comparable or corresponds to the BLUETOOTH® module 802, the WI-FI® module 1310 is comparable or corresponds to the WI-FI® module 812, the integrated circuit 1306 is comparable or corresponds to the integrated circuit 808, the accelerometer 1308 is comparable or corresponds to the accelerometer 810, and the connector 1312 is comparable or corresponds to the connector 1002 of FIG. 10 (it should be understood that the connectors 1002, 1312 are shown in differing structural configurations at least because the connector body may differ based on charging protocols or technologies but the concept of providing a male/female connector to couple with a corresponding connector remains the same).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. An apparatus for obtaining sensory data, the apparatus comprising:

a housing configured to couple to a first network device as a casing around multiple sides of the first network device and by at least partially encompassing a majority of sides of the first network device;

circuitry displaced at least partially within the housing, the circuitry including an integrated circuit, an accelerometer, and a communications interface; and a battery displaced within the housing, wherein the battery is configured to (i) wirelessly receive electrical energy thereby charging the battery, (ii) provide a first portion of the electrical energy to the circuitry displaced at least partially within the housing, and (iii) provide a second portion of the electrical energy to a battery of the first network device, and wherein the circuitry includes logic configured to perform operations including:

receiving signals from one or more network devices including the first network device, parsing a first signal to (i) identify a unique identifier of the first network device of the one or more network devices, wherein the first network device transmitted the first signal, and (ii) determine a received signal strength indicator (RSSI) value of the first signal, and transmitting a communication to the first network device indicating the RSSI value of the first signal.

2. The apparatus of claim 1, wherein the housing is formed from one or more of hardened plastic, metal, glass or composite.

3. The apparatus of claim 1, wherein the communication interface, under control by a communication interface logic of the integrated circuit, enables communications with external network devices or a cloud server.

4. The apparatus of claim 1, further comprising:

an electrical connection extending from the housing, wherein a distal end of the electrical connection terminates with an electrical connector, wherein the electrical connector is configured to couple with a charging receptacle of the first network device, and wherein an electrical charge propagates from the battery of the apparatus to a battery of the first network device when the electrical connector is coupled with the charging receptacle of the first network device.

5. The apparatus of claim 1, wherein the circuitry further comprises a vibration sensor, and wherein the logic is configured to perform further operations including:

recording vibration data from the vibration sensor and movement data from the accelerometer, wherein the vibration data and the movement data comprise the sensory data, and transmitting the sensory data to the first network device.

6. The apparatus of claim 1, wherein the housing includes: (i) a housing base that includes a suction cup attachment configured to couple to either an interior of a windshield of an automobile or a dashboard of the automobile, (ii) an arm extending from the housing base, and (iii) an adjustable grip configured to grip the first network device.

7. The apparatus of claim 6, wherein the arm is either extendable in a distal direction from the housing base or rotatable about a fixed position on the housing base.

8. A system comprising:
a housing configured to couple to a first network device, wherein the housing includes: (i) a housing base that includes a suction cup attachment configured to couple to either an interior of a windshield of an automobile or a dashboard of the automobile, (ii) an arm extending from the housing base, and (iii) an adjustable grip configured to grip the first network device;
a battery displaced within the housing;
an accelerometer;
a memory to store executable instructions; and
circuitry coupled with the memory, wherein the instructions, when executed by the circuitry, cause performance of operations including:
receiving signals from one or more network devices including the first network device,
parsing a first signal to (i) identify a unique identifier of the first network device of the one or more network devices, wherein the first network device transmitted the first signal, and (ii) determine a received signal strength indicator (RSSI) value of the first signal, and
transmitting a communication to the first network device indicating the RSSI value of the first signal, wherein the circuitry further comprises a vibration sensor, and wherein the logic is configured to perform further operations including:
recording vibration data from the vibration sensor and movement data from the accelerometer, wherein the vibration data and the movement data comprise the sensory data, and
transmitting the sensory data to the first network device.

9. The system of claim 8, wherein the housing is formed from one or more of hardened plastic, metal, glass or composite.

10. The system of claim 8, wherein the communication interface, under control by a communication interface logic of the integrated circuit, enables communications with external network devices or a cloud server.

11. The system of claim 8, wherein the housing is configured to couple to the first network device by at least partially encompassing a majority of sides of the first network device.

12. The system of claim 8, further comprising:
an electrical connection extending from the housing, wherein a distal end of the electrical connection terminates with an electrical connector, wherein the electrical connector is configured to couple with a charging receptacle of the first network device, and wherein an electrical charge propagates from the battery displaced within the housing to a battery of the first network device when the electrical connector is coupled with the charging receptacle of the first network device.

13. The system of claim 8, wherein the housing includes a charging receptacle that is configured to receive an external connector such that an electrical charge propagates from the external connector to the battery displaced within the housing.

14. The system of claim 8, wherein the arm is either extendable in a distal direction from the housing base or rotatable about a fixed position on the housing base.

15. An apparatus for obtaining sensory data, the apparatus comprising:
a housing configured to couple to a first network device;
a battery displaced within the housing;
a structural attachment including a first structural wing attachment and a second structural wing attachment, wherein the structural attachment is configured to couple the apparatus to the first network device; and
circuitry displaced at least partially within the housing, the circuitry including an integrated circuit, an accelerometer, and a communications interface, wherein the circuitry includes logic configured to perform operations including:
receiving signals from one or more network devices including the first network device,
parsing a first signal to (i) identify a unique identifier of the first network device of the one or more network devices, wherein the first network device transmitted the first signal, and (ii) determine a received signal strength indicator (RSSI) value of the first signal, and
transmitting a communication to the first network device indicating the RSSI value of the first signal.

16. An apparatus for obtaining sensory data, the apparatus comprising:
a housing configured to couple to a first network device;
a battery displaced within the housing;
a twist-lock attachment configured to couple the apparatus to the first network device; and
circuitry displaced at least partially within the housing, the circuitry including an integrated circuit, an accelerometer, and a communications interface, wherein the circuitry includes logic configured to perform operations including:
receiving signals from one or more network devices including the first network device,
parsing a first signal to (i) identify a unique identifier of the first network device of the one or more network devices, wherein the first network device transmitted the first signal, and (ii) determine a received signal strength indicator (RSSI) value of the first signal, and
transmitting a communication to the first network device indicating the RSSI value of the first signal.

* * * * *